US012507322B2

(12) United States Patent
Rurs

(10) Patent No.: US 12,507,322 B2
(45) Date of Patent: Dec. 23, 2025

(54) SYSTEMS AND METHODS FOR FACILITATING HEATING OF AN ITEM

(71) Applicant: Appear Inc., San Francisco, CA (US)

(72) Inventor: Prashant Rurs, San Francisco, CA (US)

(73) Assignee: Appear Inc., San Francisco, CA (US)

( * ) Notice: Subject to any disclaimer, the term of this patent is extended or adjusted under 35 U.S.C. 154(b) by 860 days.

(21) Appl. No.: 17/529,961

(22) Filed: Nov. 18, 2021

(65) Prior Publication Data

US 2023/0156869 A1 May 18, 2023

(51) Int. Cl.
*H05B 3/36* (2006.01)
*H05B 3/14* (2006.01)
*H05B 3/34* (2006.01)

(52) U.S. Cl.
CPC ............... *H05B 3/36* (2013.01); *H05B 3/145* (2013.01); *H05B 3/342* (2013.01); *H05B 2203/011* (2013.01); *H05B 2214/04* (2013.01)

(58) Field of Classification Search
CPC ........ H05B 3/36; H05B 3/342; H05B 1/0272; H05B 3/145; H05B 2203/036
See application file for complete search history.

(56) References Cited

U.S. PATENT DOCUMENTS

| | | | | |
|---|---|---|---|---|
| 9,338,927 | B2 | 5/2016 | Mataya et al. | |
| 9,877,358 | B2 | 1/2018 | Feng et al. | |
| 10,172,739 | B2 | 1/2019 | Benyaminpour et al. | |
| 11,065,149 | B2 | 7/2021 | Benyaminpour et al. | |
| 11,135,243 | B2 | 10/2021 | Ueda et al. | |
| 2006/0051079 | A1* | 3/2006 | Gerhardinger | F24D 13/022 392/435 |
| 2016/0001632 | A1* | 1/2016 | Song | H05B 3/20 219/202 |
| 2017/0069436 | A1* | 3/2017 | Lee | H01G 11/26 |
| 2018/0103694 | A1* | 4/2018 | Fortenbacher | A41D 13/0051 |
| 2020/0015323 | A1* | 1/2020 | Chen | H05B 3/145 |
| 2021/0167376 | A1* | 6/2021 | O'Dwyer | H01M 50/121 |

FOREIGN PATENT DOCUMENTS

| | | | | | |
|---|---|---|---|---|---|
| CN | 201846842 | U | * | 6/2011 | |
| CN | 108882411 | A | * | 11/2018 | D03D 15/00 |
| KR | 102142247 | B1 | * | 4/2018 | |
| KR | 102263098 | B1 | * | 4/2020 | H05B 3/03 |

OTHER PUBLICATIONS https://www.amazon.com/Heating-Back-Pain-Cramps-Relief accessed on Nov. 19, 2021.
https://www.taotronics.com/products/hm-bd003-homech-heating-pad-for-back-pain-and-cramps accessed on Nov. 19, 2021.
https://www.ororowear.com/collections/outlet/op-vest accessed Nov. 19, 2021.

* cited by examiner

*Primary Examiner* — Thien S Tran
(74) *Attorney, Agent, or Firm* — Fox Rothschild LLP; Carol E. Thorstad-Forsyth

(57) ABSTRACT

A heating pad, a portable electric heater and/or an article of manufacture. The heating pad comprising: a first heating fabric comprising graphene; a nanotube-based film having a first surface coupled to the first heating fabric; a second heating fabric coupled to a second opposing surface of the nanotube-based film; and a flexible circuit disposed between the first heating fabric and the nanotube-based film, the flexible circuit configured to facilitate an increase in temperature by at least the first and second heating fabrics.

75 Claims, 20 Drawing Sheets

SYSTEMS AND METHODS FOR FACILITATING HEATING OF AN ITEM

BACKGROUND

Statement of the Technical Field

The present document concerns heating systems. More specifically, the present document concerns systems and methods for facilitating heating of item(s).

Description of the Related Art

Insulated bags are often used to facilitate the delivery of food items from a restaurant to a customer location. The insulated bags are waterproof bags made with various materials like nylon, vinyl or other exterior layer designed to keep the food items properly heated and/or chilled during transit. The insulated bags have limitations and challenges. For example, the insulation bags may not be airtight which results in heat loss from the food items and are absent of any heat generation functionality.

SUMMARY

This document concerns systems and methods for providing and/or operating a heating pad. The heating pad comprises: a first heating fabric comprising graphene; a nanotube-based film having a first surface coupled to the first heating fabric; a second heating fabric coupled to a second opposing surface of the nanotube-based film (which may be graphene based or may be absent of any graphene); and a flexible circuit disposed between the first heating fabric and the nanotube-based film. The flexible circuit is configured to facilitate an increase in temperature by the first heating fabric and/or second heating fabrics.

The first heating fabric layer can include, but is not limited to, a monolayer of carbon atoms connected to each other via $sp^2$ hybridization to form a planar two-dimensional hexagonal honeycomb lattice structure. The nanotube-based film can include, but is not limited to, a carbon nanotube film. The second heating fabric layer can include, but is not limited to, a carbon fiber paper, a carbon fiber cloth and/or a graphite fiber cloth. The heating pad may be configured to: convert at least a given amount (e.g., ≥50% or 75%) of electric energy into heat energy; have a radiation efficiency of at least a given amount (e.g., ≥50% or 70%); and/or operate with a voltage less than or equal to a given voltage (e.g., 36 Volts). The heating pad may be flexible and washable without affecting physical and electrical properties of the heating pad. The heating pad may be configured to: reach 140° F. in less than or equal to sixty seconds; reach 200° F. in less than or equal to one hundred eighty seconds; and/or experience a difference or rise in temperature within three seconds of power being supplied thereto.

The flexible circuit may comprise a flexible battery (e.g., a graphene battery) or the flexible circuit may be energized by a flexible battery. The flexible circuit may alternatively or additionally comprise a first conductive line portion and a second conductive line portion which are separately supplied power from a power source at the same time. The first and second conductive line portions may be designed and positioned relative to each other such that heat radiation is emitted uniformly across exposed surfaces of the heating pad. The first and second conductive line portions may partially overlap each other while being electrically isolated from each other. For example, the first conductive line portion may comprise a plurality of first fingers. At least one of the first fingers resides between a plurality of second fingers of the second conductive line portion. At least one of the second fingers resides between the plurality of fingers of the first conductive line portion.

In some scenarios, the flexible circuit may also comprise a cable connected to the first and second conductive lines and a controller removably connected to the cable. The controller may be configured to allow a user to selectively control an amount of current supplied to the first and second conductive lines from a power source. The power source may be external to the heating pad and comprise a graphene battery, a flexible graphene battery or an external energy source. The controller may be configured to facilitate wireless communications between the heating pad and an external communication device for remotely controlling operations of the heating pad. Additionally or alternatively, the flexible circuit may be configured to facilitate wireless communications between the heating pad and an external communication device for remotely controlling operations of the heating pad.

The flexible circuit may further comprise a flexible sensor and be configured to cause the heating pad to transition operational modes based on sensor data generated by the flexible sensor. The operational modes can include, but are not limited to, an off mode, an on mode, a low heat mode, a medium heat mode, and/or a high heat mode. The flexible sensor can include, but is not limited to, a pressure sensor, a temperature sensor, a location sensor, a proximity sensor, a sound sensor, and/or a camera.

In those or other scenarios, the heating pad is at least partially encompassed by a flexible output device. The flexible output device can include, but is not limited to, a light strip, an audio device and/or a vibration device.

The present document also concerns systems and methods for providing and operating a portable electric heater. The portable electric heater comprises: a controller configured to control a temperature setting of the portable electric heater; and a heating pad communicatively coupled to the controller. The heating pad comprises a plurality of material layers arranged in a stack. The material layers comprise: a first heating fabric comprising graphene; a nanotube-based film having a first surface coupled to the first heating fabric; a second heating fabric coupled to a second opposing surface of the nanotube-based film; and a flexible circuit disposed between the first heating fabric and the nanotube-based film. The flexible circuit is configured to facilitate an increase in temperature by at least the first and second heating fabrics.

The present document further concerns systems and methods for providing a product with a heating capability. The product can include, but is not limited to, an insulative bag (e.g., for use in the food industry), a piece of clothing (e.g., a shirt, shorts, pants, jacket, etc.), footwear (e.g., boots, insoles for shoes, etc.), bedding (e.g., sheet, blanket, pillow, etc.), a medical apparatus (e.g., back brace, etc.), furniture (e.g., a massage chair, coach, etc.), wellness industry (e.g., spa beds, spa mats, massage equipment, etc.) sports & fitness industry (e.g., gym equipment, gym gears, pain relief heating pads, yoga mat, etc.) and/or other item (e.g., a car seat, steering wheel, etc.). The product comprises a main body; and a heating pad disposed on the main body or in a pocket of the main body. The heating pad can be the same as or similar to the heating pad described herein.

BRIEF DESCRIPTION OF THE DRAWINGS

This disclosure is facilitated by reference to the following drawing figures, in which like numerals represent like items throughout the figures.

DETAILED DESCRIPTION

Figure 1:
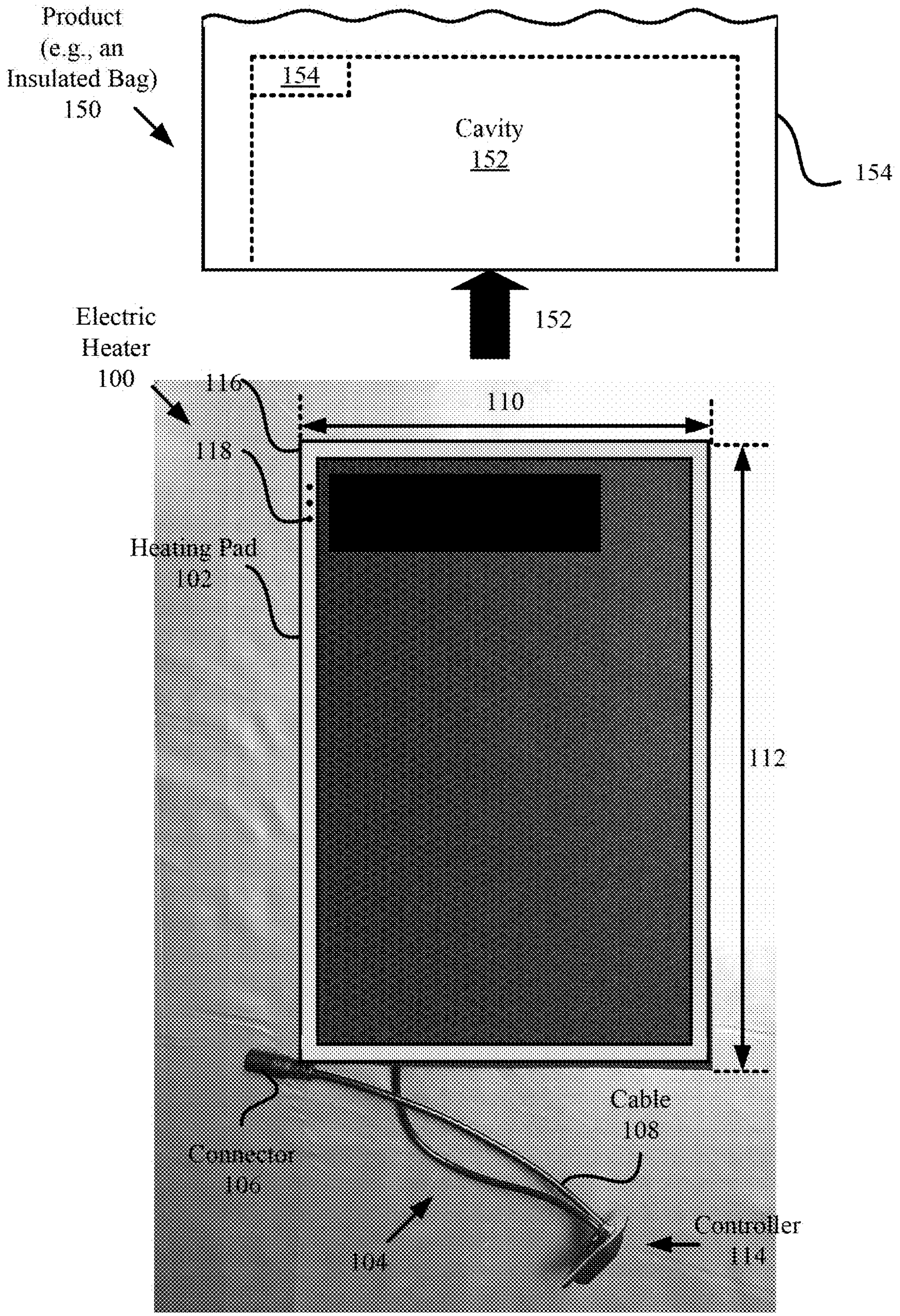
FIG. 1 provides a top view of an illustrative electric heater.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, insulated bags are often used to facilitate the delivery of food items from a restaurant to a customer location (e.g., house or place of employment). The insulated bags are waterproof bags made with a nylon or vinyl exterior layer designed to keep the food items properly heated and/or chilled during transit. The insulated bags have limitations and challenges. For example, the insulated bags may not be airtight which results in heat loss from the food items and are absent of any heat generation functionality to re-warm the foot items.

The present solution provides a means to overcome these drawbacks of insulated bags. In this regard, the present solution concerns a portable electric heater comprising a flexible heating pad with layer(s) of graphene fabric. The graphene fabric is designed and engineered using advance material science. The electric heater can be integrated in an insulated bag to facilitate the heating of items disposed on or inside the insulated bag (e.g., in a cavity or pocket). The electric heater may be configured to generate heat from, for example, 40° C. (104° F.) to 130° C. (266° F.). This temperature range allows various types of food items to be keep warm in the insulated bag at respectively optimal temperature(s). The circuit components of the electric heater are flexible, rugged and operationally efficient. Wireless communication technology may be integrated with the electric heater such that a user thereof can remotely control operations of the electric heater via software application(s) running on a mobile device (e.g., a smart phone) or from a remote system (e.g., a cloud based system). The wireless communication technology can include, but is not limited to, WiFi and Bluetooth. The heating pad is rugged, washable and durable.

Figure 10A:
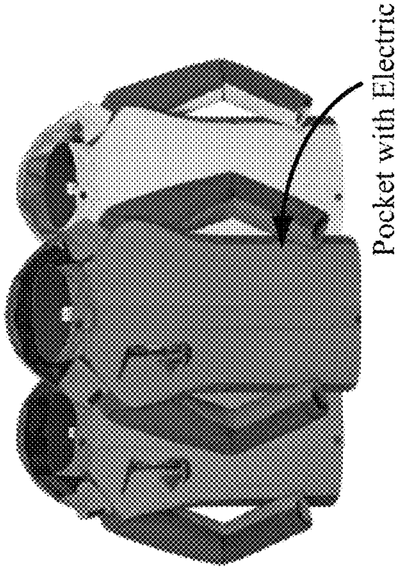
FIG. 10A-10F (collectively referred to as "FIG. 10") show the electric heater being used in various products.
Figure 10B:
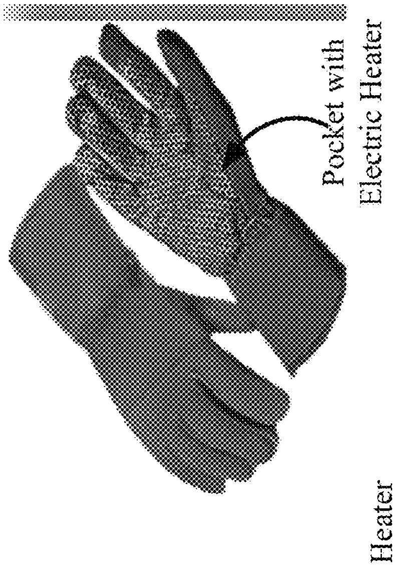
Figure 10C:
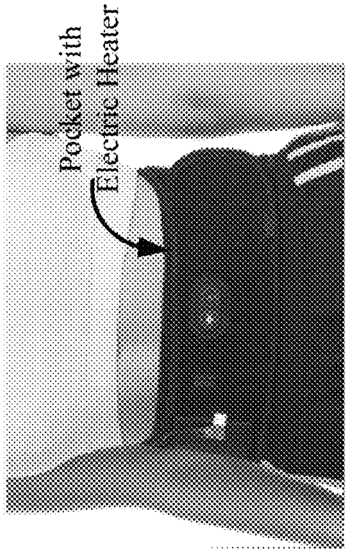
Figure 10D:
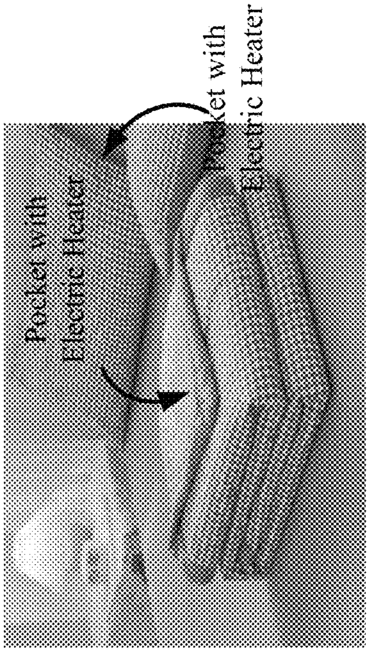
Figure 10E:
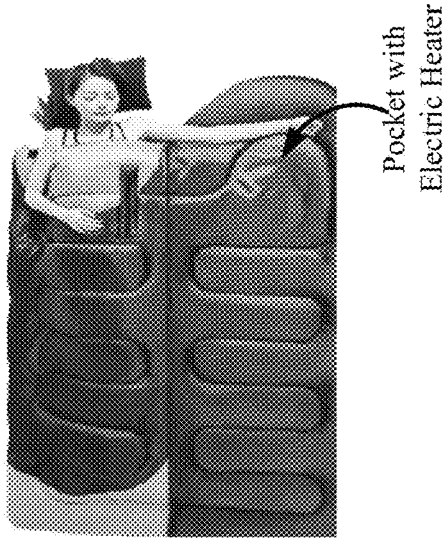
Figure 10F:
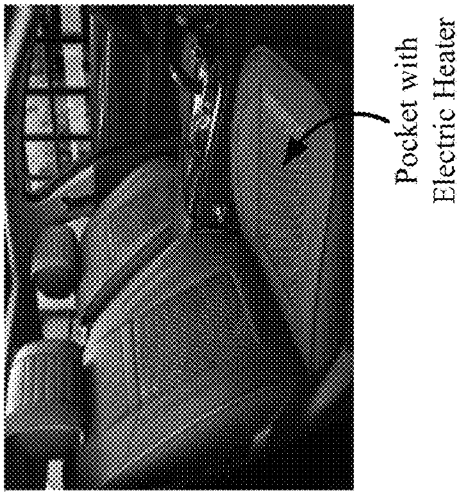

Although the present solution is described herein in relation to the insulated bag and food industry applications, the present solution is not limited in this regard. The electric heater of the present solution can be used in other applications such as clothing applications (as shown in FIG. 10A), footwear applications, smart gear applications (as shown in FIG. 10C), bedding applications (as shown in FIG. 10D), pillow applications (as shown in FIG. 10D), furniture applications, automobile application (e.g., car seats as shown in FIG. 10F), wellness industry applications, sports & fitness industry applications, and/or medical applications (e.g., as pain relief pads as shown in FIG. 10E).

Thus, this document concerns systems and methods for providing and/or operating a heating pad. The heating pad comprises: a first heating fabric comprising graphene; a nanotube-based film having a first surface coupled to the first heating fabric; a second heating fabric coupled to a second opposing surface of the nanotube-based film; and a flexible circuit disposed between the first heating fabric and the nanotube-based film, the flexible circuit configured to facilitate an increase in temperature by at least the first and second heating fabrics.

The first heating fabric layer can include, but is not limited to, a monolayer of carbon atoms connected to each other via $sp^2$ hybridization to form a planar two-dimensional hexagonal honeycomb lattice structure. The nanotube-based film can include, but is not limited to, a carbon nanotube film. The second heating fabric layer can include, but is not limited to, a carbon fiber paper, a carbon fiber cloth and/or a graphite fiber cloth. The heating pad may be configured to: convert at least a given amount (e.g., ≥50% or 75%) of electric energy into heat energy; have a radiation efficiency of at least a given amount (e.g., ≥50% or 70%); and/or operate with a voltage less than or equal to a given voltage (e.g., 36 Volts). The heating pad may be flexible and washable without affecting physical and electrical properties of the heating pad. The heating pad may be configured to: reach 140° F. in less than or equal to sixty seconds; reach 200° F. in less than or equal to one hundred eighty seconds; and/or experience a difference or rise in temperature within three seconds of power being supplied thereto.

The flexible circuit may comprise a flexible battery (e.g., a graphene battery) or the flexible circuit may be energized by a flexible battery. The flexible circuit may alternatively or additionally comprise a first conductive line portion and a second conductive line portion which are separately supplied power from a power source at the same time. The first and second conductive line portions may be designed and positioned relative to each other such that heat radiation is emitted uniformly across exposed surfaces of the heating pad. The first and second conductive line portions may partially overlap each other while being electrically isolated from each other. For example, the first conductive line portion may comprise a plurality of first fingers. At least one of the first fingers resides between a plurality of second fingers of the second conductive line portion. At least one of the second fingers resides between the plurality of fingers of the first conductive line portion.

In some scenarios, the flexible circuit may also comprise a cable connected to the first and second conductive lines and a controller removably connected to the cable. The controller may be configured to allow a user to selectively control an amount of current supplied to the first and second conductive lines from a power source. The power source may be external to the heating pad and comprise a graphene battery or any other powers source. The controller may be configured to facilitate wireless communications between the heating pad and an external communication device for remotely controlling operations of the heating pad. Additionally or alternatively, the flexible circuit may be configured to facilitate wireless communications between the heating pad and an external communication device for remotely controlling operations of the heating pad.

The flexible circuit may further comprise a flexible sensor and be configured to cause the heating pad to transition operational modes based on sensor data generated by the flexible sensor. The operational modes can include, but are not limited to, an off mode, an on mode, a low heat mode, a medium heat mode, and/or a high heat mode. The flexible sensor can include, but is not limited to, a pressure sensor, a temperature sensor, a location sensor, a proximity sensor, a sound sensor, and/or a camera.

In those or other scenarios, the heating pad is at least partially encompassed by a flexible output device. The flexible output device can include, but is not limited to, a light strip, an audio device and/or a vibration device.

The present document also concerns systems and methods for providing and operating a portable electric heater. The portable electric heater comprises: a controller configured to control a temperature setting of the portable electric heater; and a heating pad communicatively coupled to the controller. The controller comprises a plurality of material layers arranged in a stack. The material layers comprise: a first heating fabric comprising graphene; a nanotube-based film having a first surface coupled to the first heating fabric; a second heating fabric coupled to a second opposing surface of the nanotube-based film; and a flexible circuit disposed between the first heating fabric and the nanotube-based film. The flexible circuit is configured to facilitate an increase in temperature by at least the first and second heating fabrics. The features of the heating pad can be the same as or similar to those described above.

The present document further concerns systems and methods for providing a product with a heating capability. The product can include, but is not limited to, an insulative bag (e.g., for use in the food industry), a piece of clothing (e.g., a shirt, shorts, pants, jacket, etc.), footwear (e.g., boots, insoles for shoes, etc.), bedding (e.g., sheet, blanket, pillow, etc.), a medical apparatus (e.g., back brace, etc.), furniture (e.g., a massage chair, coach, etc.), wellness industry (e.g., spa beds, spa mats, massage equipment, etc.) sports & fitness industry (e.g., gym equipment, pain relief heating pads, yoga mats, etc.) and/or other item (e.g., a car seat, steering wheel, etc.). The product comprises a main body; and a heating pad disposed on the main body or in the main body (e.g., in a pocket or cavity of the main body). The heating pad can be the same as or similar to the heating pad described herein.

Referring now to FIG. 1, there is provided a top view of an illustrative electric heater 100 in accordance with the present solution. A side perspective view of the electric heater 110 is provided in FIG. 2. The electric heater 110 overcomes many drawbacks of convention electric heaters and/or heating pads. For example, the electric heater 110 has a relatively faster heating speed (i.e., needs less time to heat once powered, e.g., ≤60 seconds to heat), uniform heating across its surfaces, a relatively high electric-heat conversion rate (e.g., ≥20%, 30%, 40%, 50%, 60%, 70% or 75%) electric energy is converted into heat energy), an improved heat radiation efficiency (e.g., ≥20%, 30%, 40%, 50%, 60% or 70%), a relatively lower superconductivity (e.g., leads to higher efficiency), a reduced probability of circuit failure, a relatively longer service life (e.g., ≥5000 hours), an improved tensile strength, and/or an improved washing stability (i.e., the heating functionality does not degrade when the heating pad is washed). The electric heater 110 is also configured to operate with relatively lower voltages (e.g., ≤36 V) which are human body safe voltages.

As shown in FIG. 1, the electric heater 100 is a portable device that can be used separate from or in conjunction with a product 150. The product can include an insulted bag or other an article of manufacture (e.g., clothing, shoes, bedding, car set, etc.). Insulated bags are well known. The electric heater 100 can be inserted or otherwise disposed in a cavity/pocket 152 formed in or on a main body 154 of the product 150 as shown by arrow 152. The electric heater 100 can be removed from and re-disposed in the cavity/pocket 152 as desired. The present solution is not limited to the arrangement. In some scenarios, the electric heater 100 is simply disposed on or in the main body 154.

The electric heater is generally configured to emit thermal radiation to facilitate the heating of item(s) in proximity thereto. The item(s) can include, but is(are) not limited to, food item(s), fluid(s), body(ies) of living thing(s) (e.g., human(s) or animal(s)), electronic device(s), fabric item(s), and/or component(s) of vehicle(s) (e.g., a windshield, steering wheel and/or seat cushion).

Figure 2:
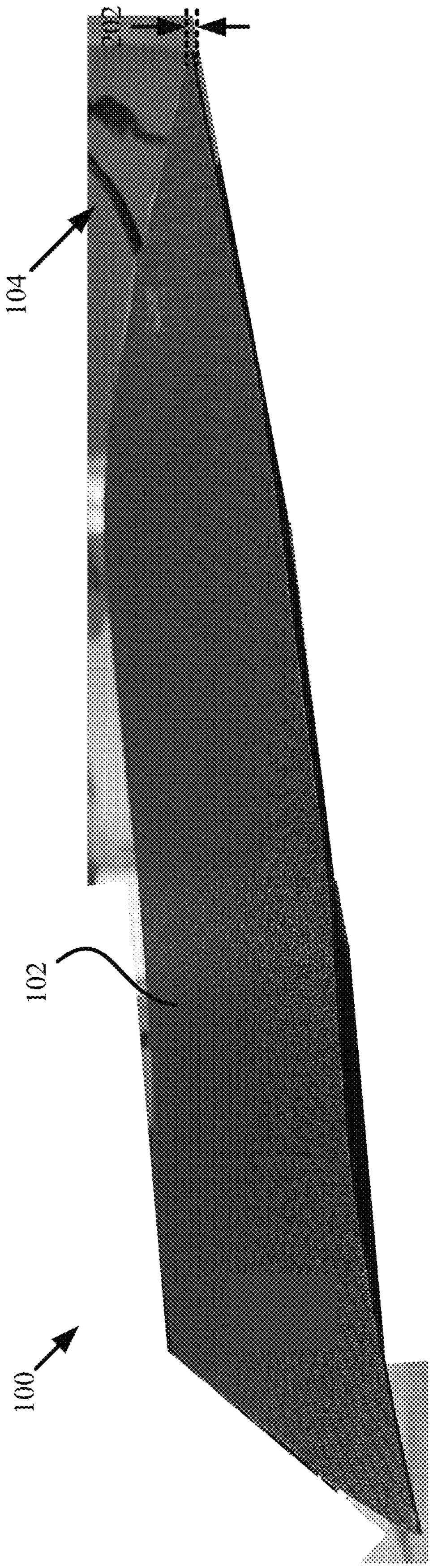
FIG. 2 provides a perspective view of the electric heater shown in FIG. 1.

As shown in FIGS. 1-2, the electric heater 100 comprises a heating pad 102 connected to an electronic coupler 104. The heating pad 102 has a width 110, a length 112, and a thickness 202. These dimensions 110, 112, 202 can be selected in accordance with any given application. In some scenarios, the thickness 202 is equal to or greater than 0.25 mm and less than or equal to 0.9 mm. The present solution is not limited in this regard.

Electronic circuit component(s) is(are) integrated in the heating pad 102. The electronic circuit component(s) is(are) provided to facilitate the heating pad's production of thermal radiation and/or user control of the heating pad. The electronic circuit components can include, but are not limited to, sensor(s), batteries and/or flexible Input/Output (I/O) device(s) 116. The input device(s) of 116 can include, but are not limited to, keypad(s), button(s), switch(es) and/or touch screen display(s). The output device(s) of 116 can be configured to provide tactile, visual and/or auditory feedback to the user. Accordingly, the output device(s) can include, but is(are) not limited to, Light Emitting Diodes (LEDs), Red Green Blue (RGB) light emitter(s), light bar(s), speaker(s), display screen(s), and/or vibration device(s). The feedback can indicate, for example, an on/off status of the electric heater 100, a temperature setting of the electric heater 100, a temperature of the heating pad 102, a power supply level of charge, and/or a health or age of the heating pad 102. The electronic circuit component(s) can include other devices as will be described in detail below.

In some scenarios, the output devices 116 can include light bar(s) and/or LEDs with different colors of light being emitted to respectively provide indications of different information. For example, a red light is emitted to indicate that the heating pad is at a high temperature. A yellow light is emitted to indicate that the heating pad is at a medium temperature. A green light is emitted to indicate that the heating pad is at a low temperature. The high, medium and low temperatures can be pre-set by a user of the heating pad or at the factory prior to distribution of the heating pad in commerce. The present solution is not limited to the particulars of this example. For example, in other scenarios, light can be continuously or periodically emitted to indicate a charge status of an internal battery.

The heating pad 102 can be at least partially (not shown) or fully (as shown in FIG. 1) encompassed by the I/O device(s) 116. Accordingly, the I/O device(s) 116 have multiple purposes such as (i) enabling user-software interactions with the heating pad, (ii) providing information, alerts and/or notifications to the user of the heating pad, (iii) protecting edges of the heating pad from fraying and/or damage, and/or (iv) providing the grip for holding the heating pad. With regard to purpose (iv), the I/O device(s) 116 can be formed of a rubber, plastic or other material which may or may not have a pattern 118, (e.g., depressions, protrusions, etc.) formed thereon to facilitate comfortable handling of the heating pad.

During operation, the electronic circuit component(s) is(are) connected to external device(s) via cable 108 and/or connector 106. Cables and connectors are well known. Any known or to be known cable and/or connector can be used here. The external device(s) can include, but is(are) not limited to, a controller 114 and/or a power source. The controller 114 can be removably coupled to cable 108 such that it can be exchanged with another controller in the event of damage thereto and/or interoperability thereof.

Figure 3:
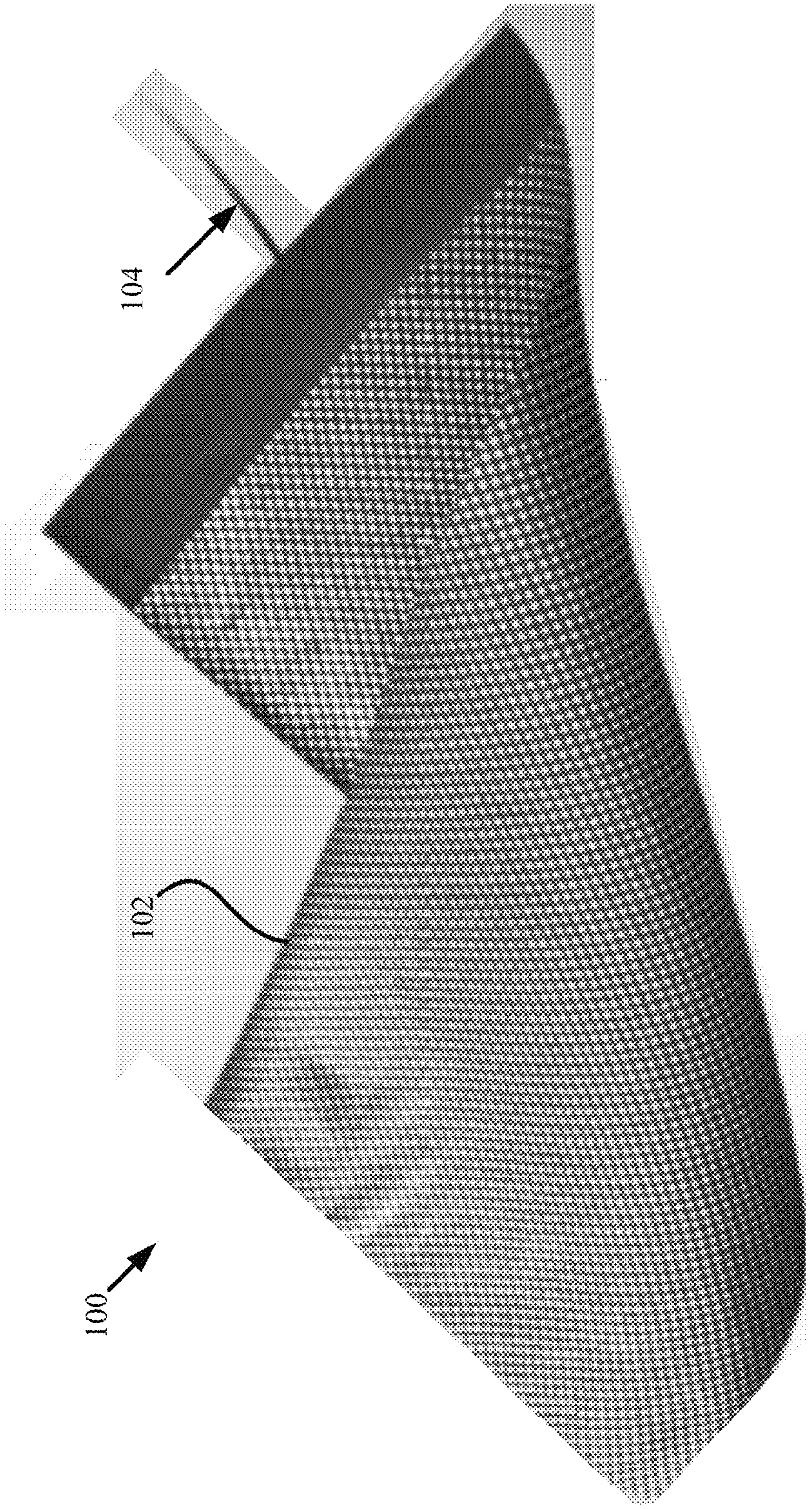
FIG. 3 provide an illustration showing a heating pad of the electric heater of FIG. 1 in a bent or folded position.
Figure 6:
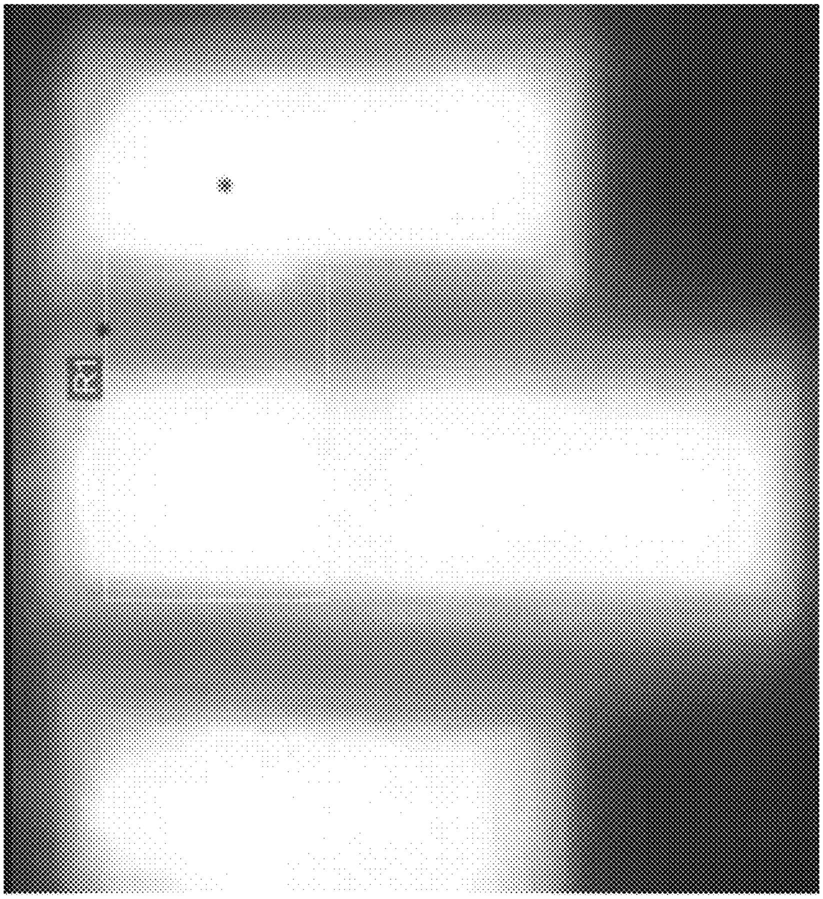
FIG. 6 provides an illustration showing a uniformity of thermal radiation emitted from the first heating fabric layer with an increased temperature.
Figure 7:
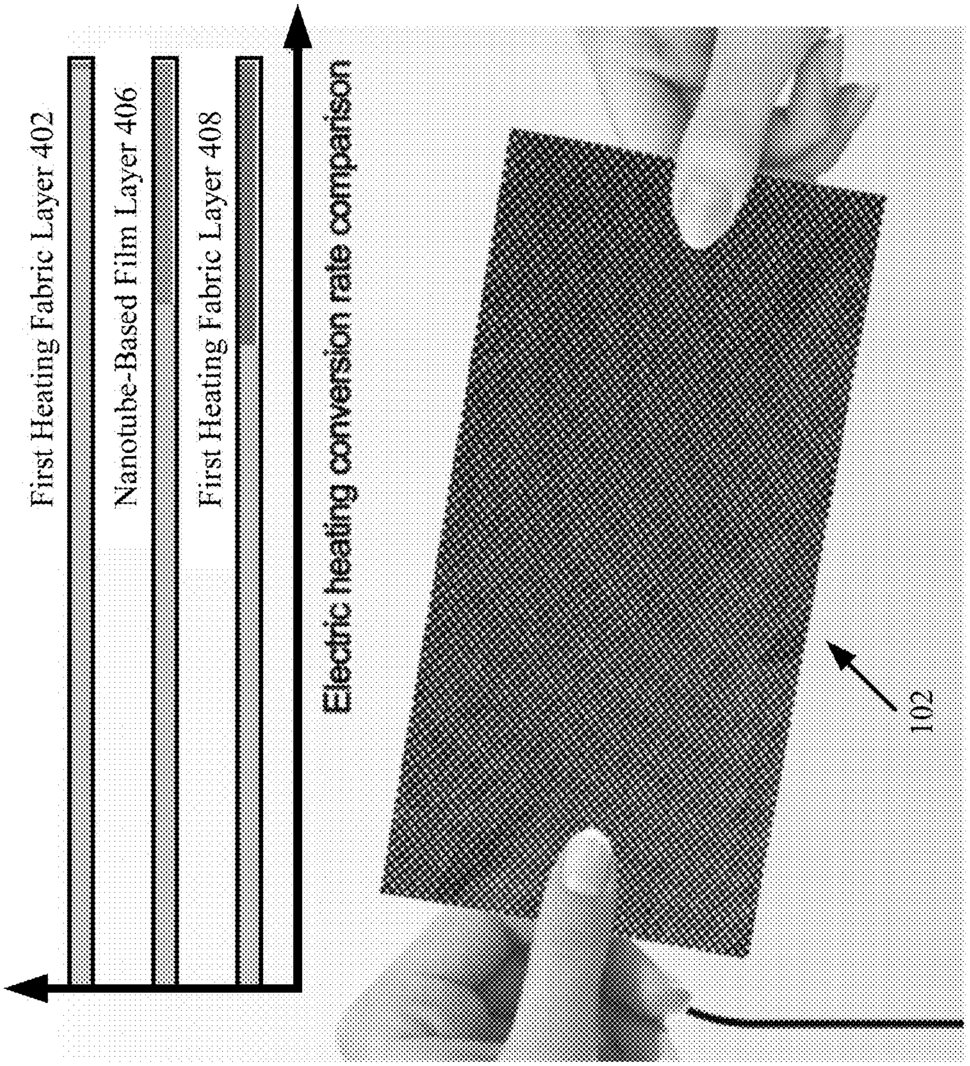
FIG. 7 provides a graph illustrating that the heating fabric layer(s) has(have) a relatively high electric energy-to-heat conversion rate and thermal radiation efficiency as compared to that of other layers of the heating pad.
Figure 8:
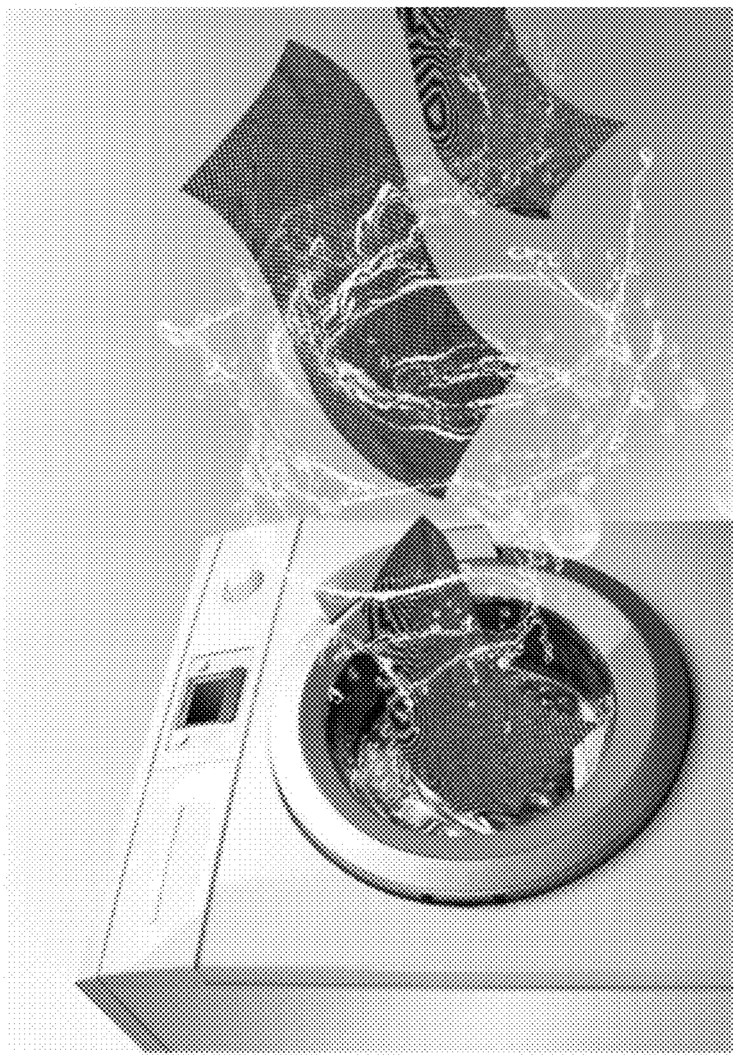
FIG. 8 provides an illustration that is useful for understanding the washability and durability of the electric heater and/or the first heating fabric layer.
Figure 9:
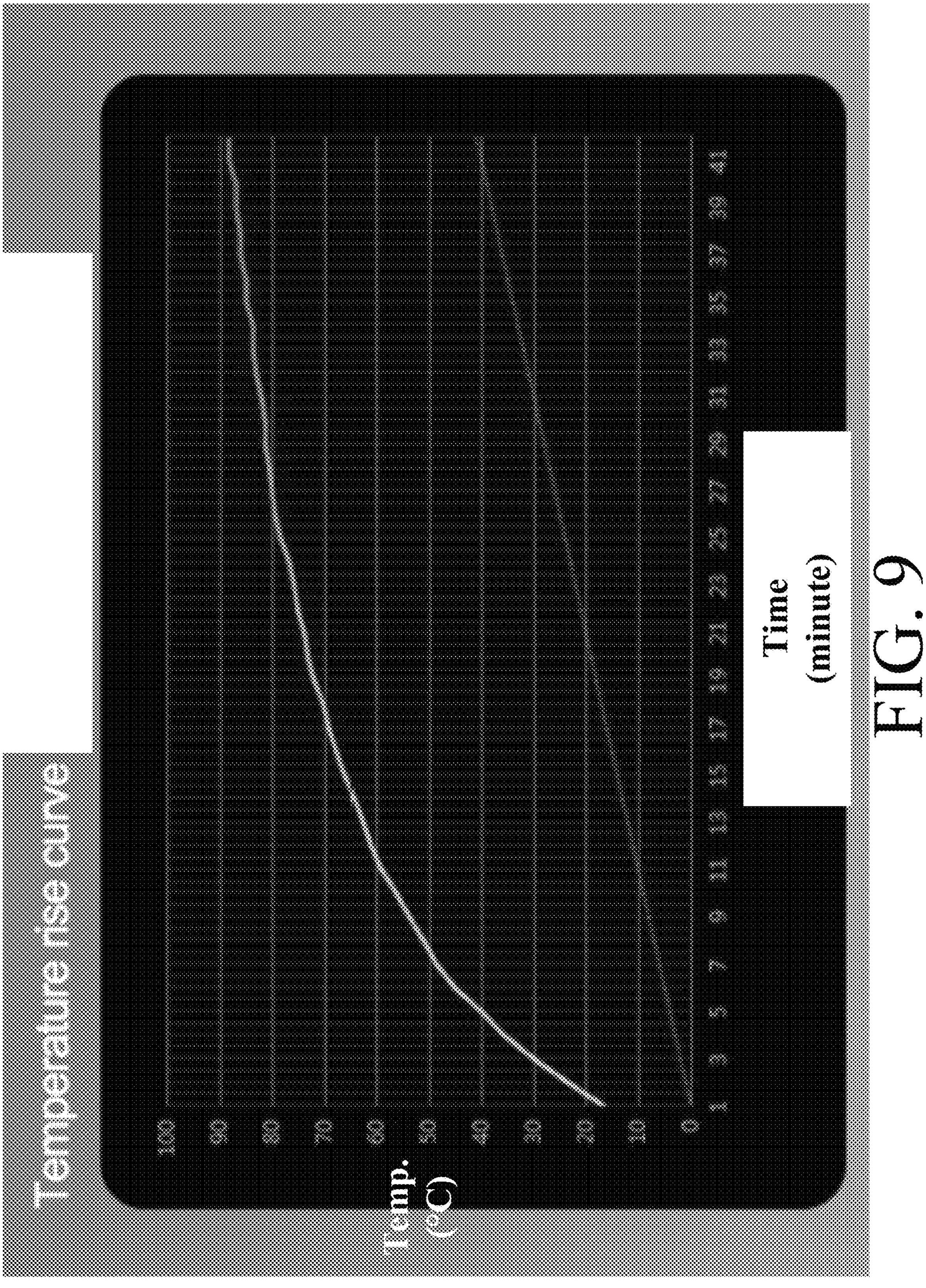
FIG. 9 provides a graph showing a rise in temperature of the electric heater in a given environment.

The heating pad 102 will now be described in more detail in relation to FIGS. 3-9. The heating pad 102 is designed to be flexible as shown in FIG. 3 and washable as shown in FIG. 8. These features of the heating pad 102 allow the electric heater 100 to be used in various applications and/or with various types of items.

The heating pad 102 is generally configured to emit thermal radiation when power is supplied thereto from an external power source and/or an internal power source. It should be noted that the heating pad 102 is designed for use with a given voltage level (e.g., 5 V, 9 V, 12 V or 24 V). The temperature of the heating pad 102 is controlled by adjusting the current suppled thereto. The current level can be selected or otherwise adjusted automatically and/or manually.

In the automatic scenarios, the current level can be adjusted based on certain information. This information includes, but is not limited to, sensor data generated by sensors integrated with electric heater 100 and/or a device (e.g., a smart phone) external to the electric heater 100. The sensor data can indicate an amount of pressure being applied to the heating pad 102, a temperature of the heating pad 102, a temperature of an external environment, a humidity of the external environment, a temperature of the item in proximity to the heating pad 102, a geographic location of the heating pad 102, and/or a height above sea level.

In the manual scenarios, the current level can be manually selected or adjusted by a user via controller 114 connected to the heating pad 102 via cable 108. The controller 114 will be described in detail below. The controller 114 may comprise switch(es), depressible button(s), rotary knob(s), and/or wireless communication technology for interfacing with an external device (e.g., a smart phone) to allow for remote control of the current level.

When power is supplied to the heating pad 102, its temperature increases by a given amount (e.g., to a temperature between 55° C. to 130° C.) in accordance with the amount of current flowing therethrough. Once the temperature reaches a desired temperature, the heating pad 102 is configured to maintain a constant temperature state.

Figure 4:
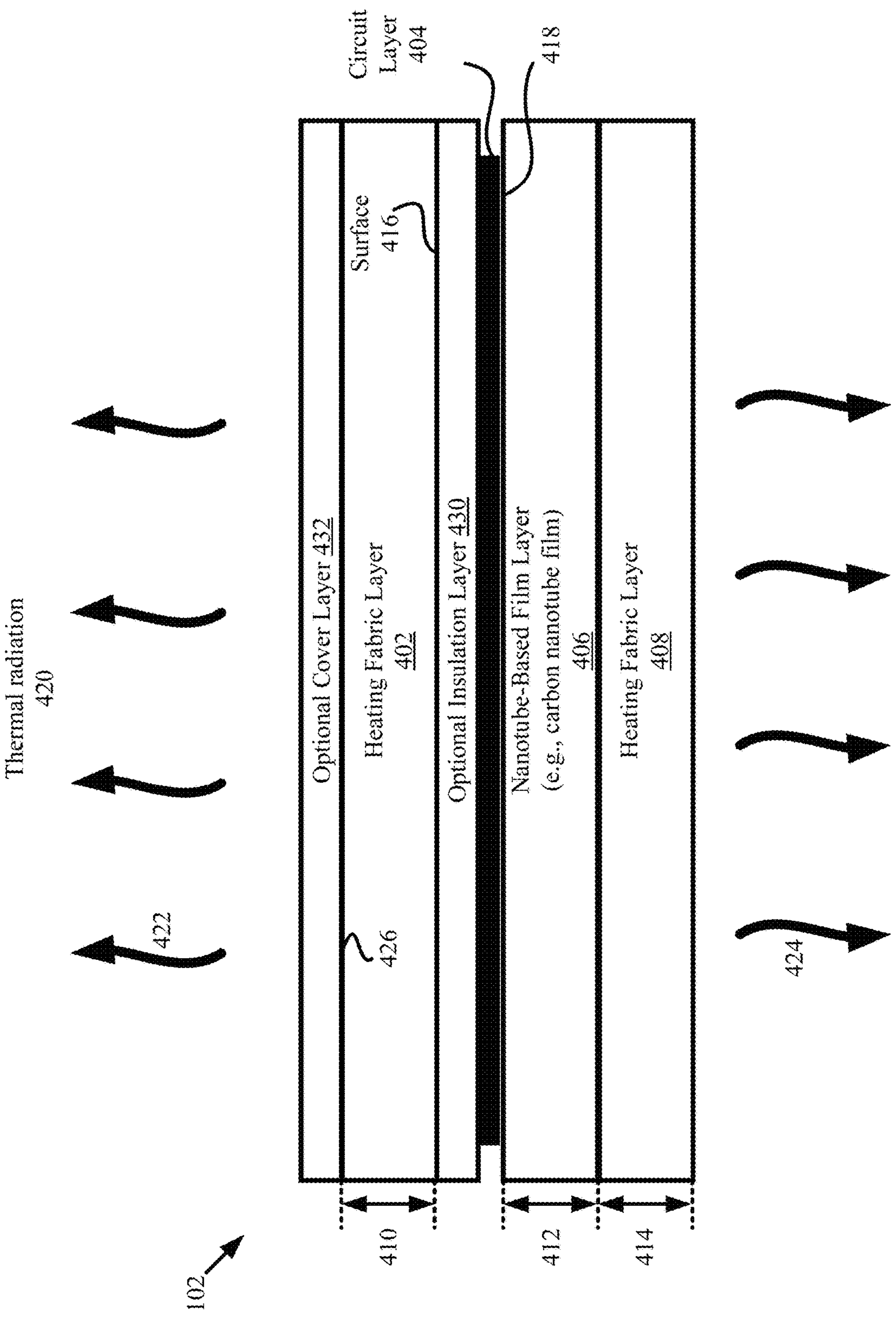
FIG. 4 provides an illustration showing a layer stack for the heating pad of FIGS. 1-3.

As shown in FIG. 4, the heating pad 102 is formed of a plurality of layers 402-408 having a stacked arrangement. The layers 402-408 can be coupled to each other via adhesive(s), tape(s), stitch(es), chemical bond(s), weld(s), and/or lamination. The stacked layers comprise a heating fabric layer 402, a circuit layer 404, a nanotube-based film layer 406, and a heating fabric layer 408. The present solution is not limited to the number of layers shown in FIG. 4. Other layers can be included in the heating pad. These other layers can include, but are not limited to, a red copper film, a cloth- or fabric-based facing layer, a thermal insulation fabric layer, and a hot-melt mesh film. In one scenario in which these other layers are provided with the heating pad, the percentage of each material can be 1% red capper film, 25% cloth- or fabric-based facing material, 25% thermal insulation fabric, 24% hot-melt mesh film, and 25% layers 402-408. The present solution is not limited to the particulars of this scenarios.

The heating fabric layer 402 is generally configured to produce thermal radiation when a voltage is supplied to the heating pad 102. In this regard, the heating fabric layer 402 comprises an electrically conductive material that can be energized when power is supplied to the heating pad 102. The electrically conductive material can include, but is not limited to, a graphene material (e.g., with an electrical conductivity at least 70% higher than copper), an oxford cloth (e.g., a woven fabric with a basketweave structure), and/or a heat storage and thermal insulation fabric. The graphene cloth can include, but is not limited to, polyester fibers and a graphene coating. The oxford cloth can include, but is not limited to, polyurethane. The The heat storage and thermal insulation fabric can include, but is not limited to, polyester fibers and a nano-silver film. The heating fabric layer 402 can have a width 410 selected in accordance with a given application (e.g., a width that is equal to or greater than 0.16 mm).

Figure 5:
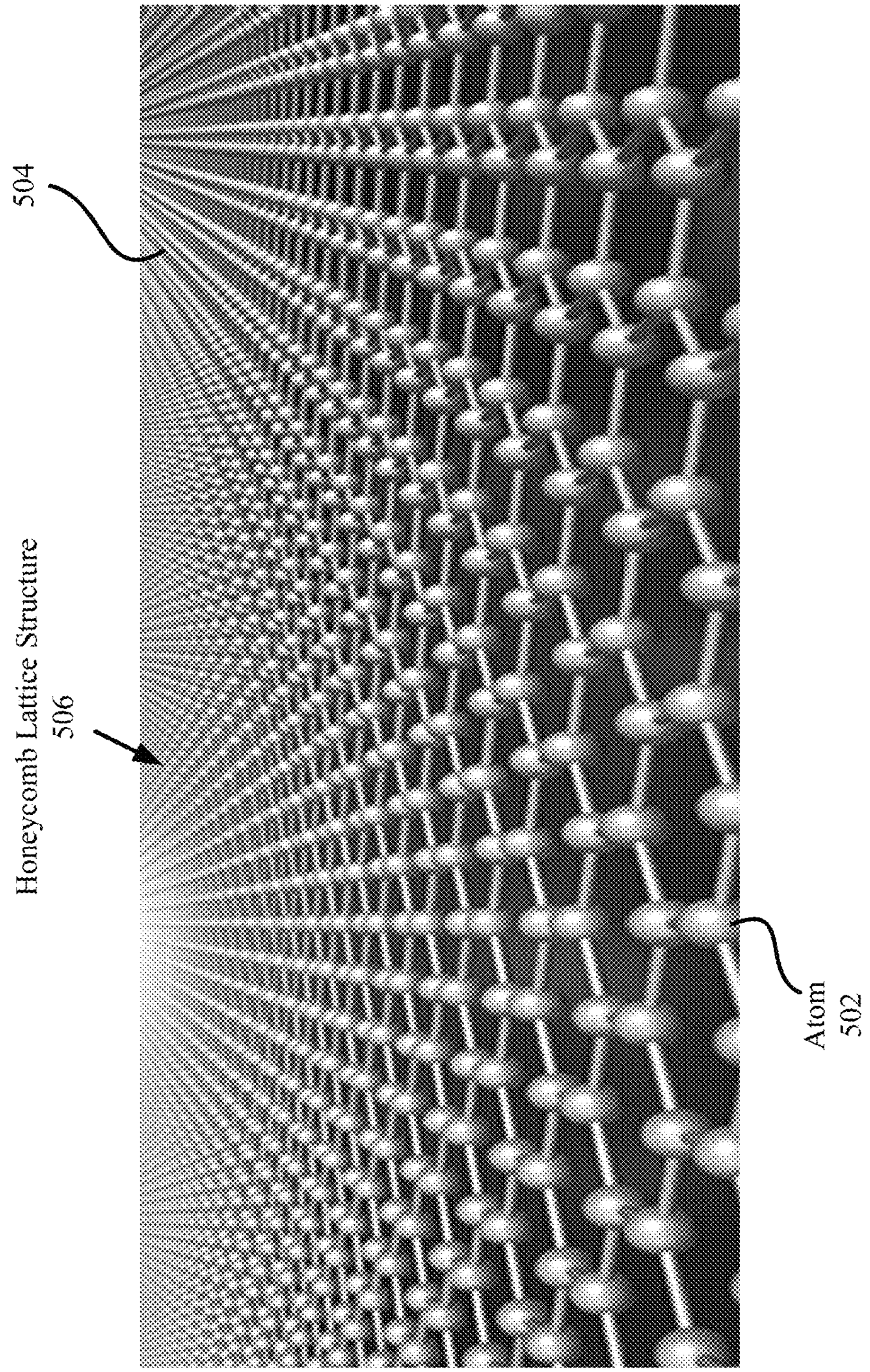
FIG. 5 provides an illustration showing a structure of the first heating fabric layer of FIG. 4.

An illustrative graphene material that can be used as the graphene coating of the heating fabric layer 402 is shown in FIG. 5. The graphene material comprises a single layer of atoms 502 (e.g., carbon atoms) connected to each other via $sp^2$ hybridization to form a planar two-dimensional hexagonal honeycomb lattice structure 506. The graphene material has relatively good optical, electrical and mechanical properties. In some scenarios, thermal radiation is emitted uniformly across the entire surface 504 of the graphene material as its temperature is increased to a given amount (e.g., 55° C.≤temperature≤130° C.). This uniform thermal radiation emission is shown in FIG. 6. Once the temperature reaches a desired temperature and the graphene materials is in thermal equilibrium, it can maintain a constant temperature state.

Based on the superconductivity and thermal properties of the graphene material, the temperature of the graphene material can increase to a given value in a relatively short amount of time (e.g., 60 to 180 seconds). As a result of the increased temperature, the graphene material releases far-infrared light waves that can penetrate item(s) that is(are) located in proximity to heating pad 102. The item(s) can include, but is(are) not limited to, food item(s), fluid(s), body(ies) of living thing(s) (e.g., human(s) or animal(s)), electronic device(s), fabric item(s), and/or component(s) of vehicle(s) (e.g., a windshield, steering wheel and/or seat cushion). In food applications, the light waves penetrate the surface(s) of the food item(s) which facilitates the prevention of a decrease in the food item temperature(s) or facilitates an increase in the food item temperature(s). In human applications, the light waves penetrate the surface tissue of the individual's body which facilitates an acceleration of blood circulation, cell metabolism and other functions that are beneficial to the individual's health.

The nanotube-based film layer 406 is generally configured to provide physical support for layers 402, 404, 408 and facilitate heating of the heating pad 102. In this regard, the nanotube-based film layer 406 comprises a film of intertwined nanotubes. The nanotubes can include, but are not limited to, carbon nanotubes. Carbon nanotube films are well known. The nanotube-based film layer 406 has a relatively high strength, electrical conductivity and thermal conductivity.

The heating fabric layer 408 is configured to provide a water-resistant layer, provide structural support to layers 402-406, and facilitate heating of the heating pad 102. The heating fabric layer 408 is also configured to allow thermal radiation to be emitted from the heating pad 102 on a side opposite to that of the heating fabric layer 402. The heating fabric layer 408 can include, but is not limited to, a carbon fiber cloth, a graphite fiber cloth, a graphene cloth and/or a carbon/graphite fiber cloth.

The circuit layer 404 is generally configured to allow a voltage and current to be applied across a surface 416 of the heating fabric layer 416 and a surface 418 of the nanotube-based film layer 406. In this regard, the circuit layer 404 comprises electronic components such as conductive material(s) (e.g., wires, a patterned film, a patterned foil and/or traces printed on layer 402 and/or 406) and/or electronic devices (e.g., flexible Integrated Circuits (ICs), sensor(s), etc.). The circuit layer 404 can be disposed on the heating fabric layer 402 and/or the nanotube-based film layer. The voltage and current may be applied uniformly or non-uniformly across surfaces 416, 418. When the voltage/current are applied, the heating pad 102 emits thermal radiation 420 therefrom in one or more directions shown by arrows 422, 424.

An insulation layer 430 may be disposed between the heating fabric layer 402 and the circuit layer 404. The insulation layer 430 can include, but is not limited to, a thermally conductive silica gel.

A cover layer 432 may be disposed on the heating fabric layer 402. The cover layer 432 can include, but is not limited to, a heat storage and insulation cloth, a hot melt omentum. The hot melt omentum can include, but is not limited to, a thermoplastic polyurethane.

The heating pad 102 can convert a relatively large amount of electric energy into heat and have a relatively high heat radiation efficiency. For example, in some scenarios as shown in FIG. 7, the heating pad 102 converts more than 90% of electric energy into heat and has a heat radiation efficiency of more than 70%. The present solution is not limited to the particulars of this example. A graph is provided in FIG. 9 that shows a temperature rise curve for the heating pad 102 in a given scenario with a given voltage rating (e.g., 5 V).

The relative percentages of each layer 402-408, 430, 432 can be selected in accordance with a given application. For example, in some scenarios, the heating pad comprises 1% red copper film 404, 25% cloth/fabric-based facing layer 432, 25% thermal insulation fabric layer 430, 24% hot melt mesh film 432, and 25% layers 402, 406, 408. In other scenarios, the heating pad comprises 31.7% layer 402, 4.9% layer 404, 31.7% layer 306 and 31.7% layer 408. Accordingly, layer 402 can have a thickness of 0.08 mm. Layer 404 can have a thickness of 0.05 mm. Layer 406 can have a thickness of 0.08 mm. Layer 408 can have a thickness of 0.08 mm. The present solution is not limited to the particulars of these scenarios.

Figure 11:
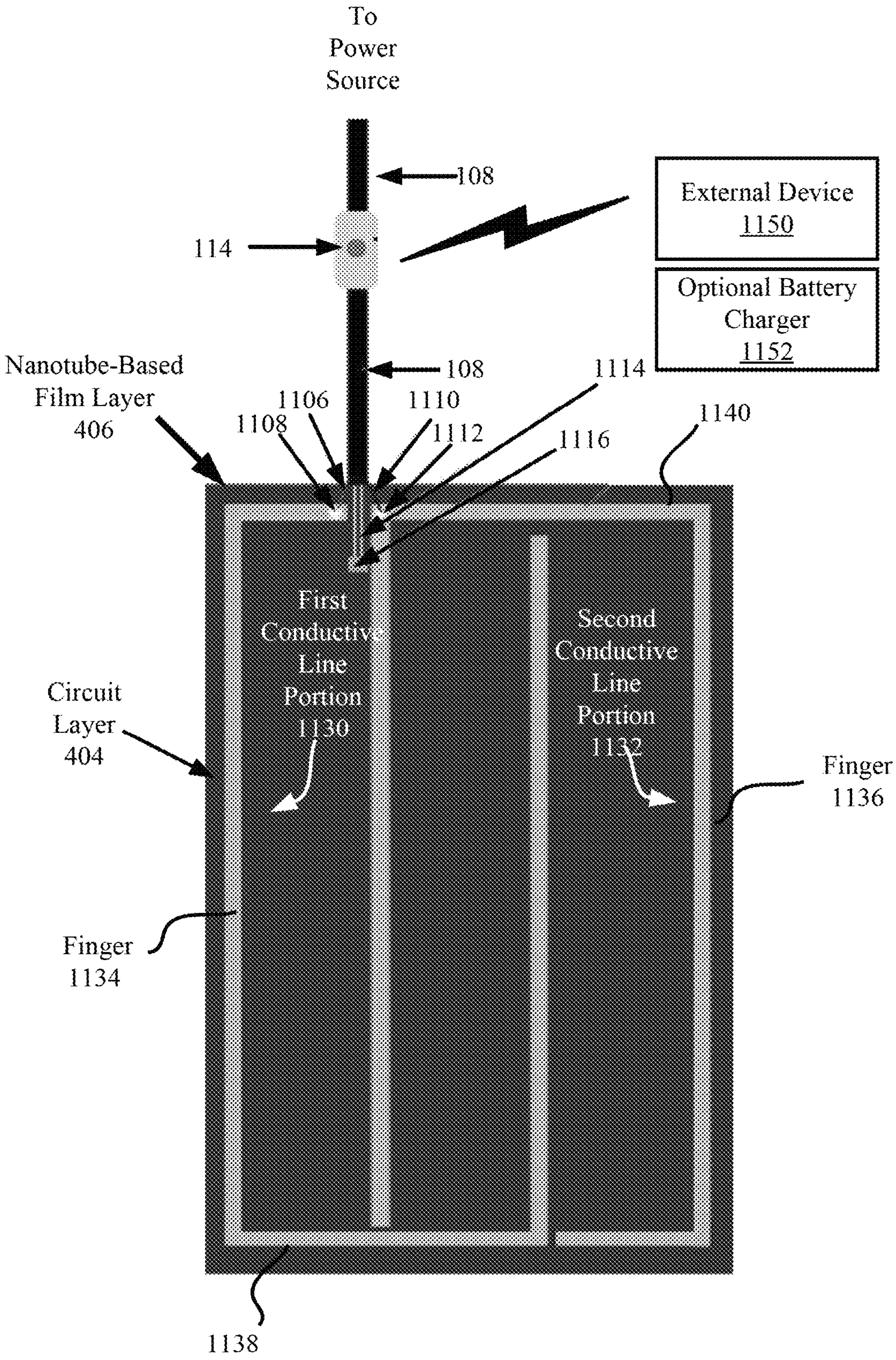
FIG. 11 provides a top view of the nanotube-based film layer and conductive layer of the heating pad connected to a controller.
Figure 12:
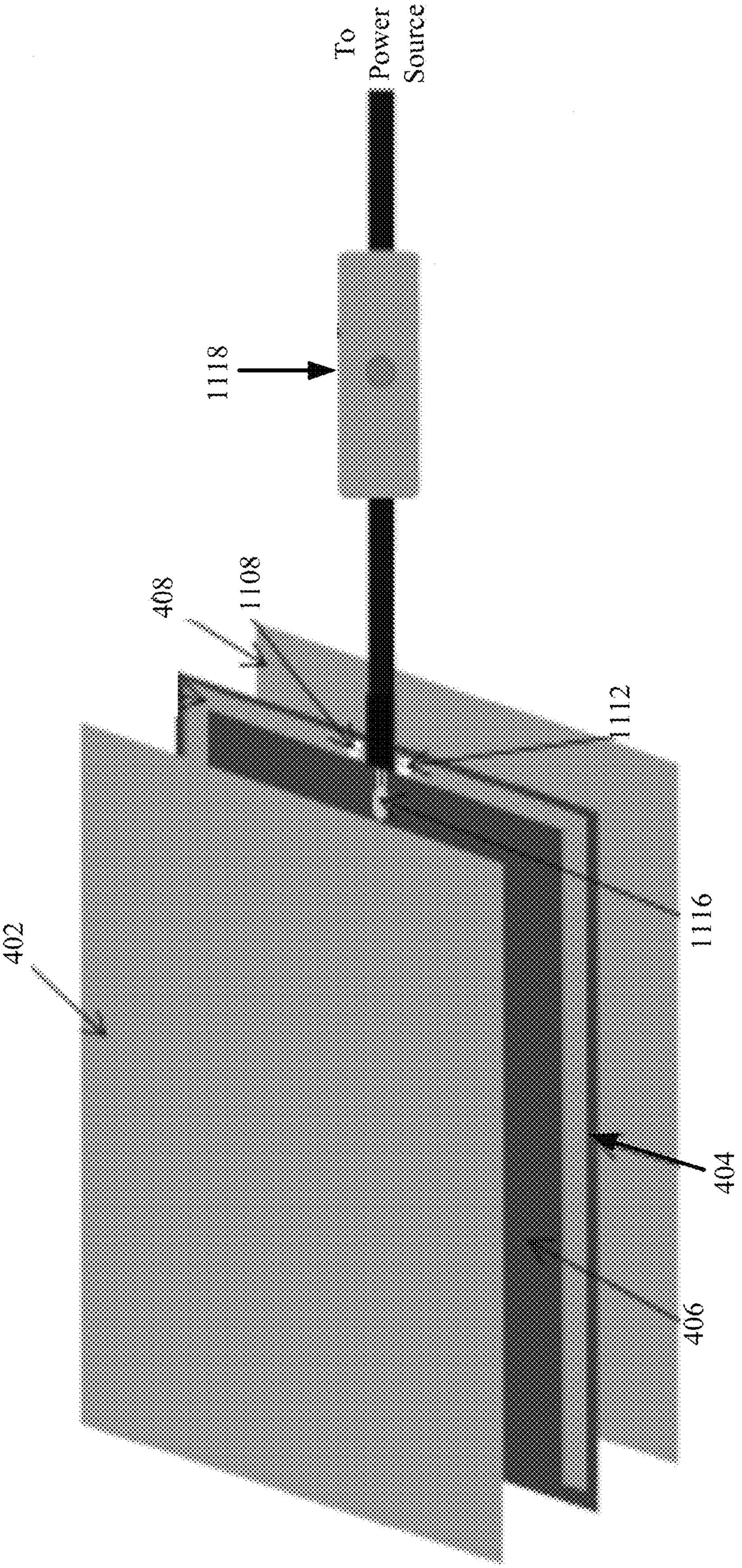
FIG. 12 provides an exploded view of the heating pad.

Referring now to FIGS. 11-12, there are provided illustrations showing the nanotube-based film layer 406 with the circuit layer 404 disposed thereon. The circuit layer 404 comprises a first conductive line portion 1130 and a second conductive line portion 1132. Although two conductive line portions are shown in FIG. 11. The present solution is not limited in this regard. Any number of conductive line portions can be provided in accordance with a given application.

The first conductive line portion 1130 comprises two fingers 1134 which are connected to each other via connection line 1138. The second conductive line portion 1132 comprises two fingers 1136 that are connected to each other via connection line 1140. The fingers 1134 and 1136 are interdigitated meaning that at least one finger 1134 resides between fingers 1136 and at least one finger 1136 resides between fingers 1134. During operation, power is provided to both conductive line portions simultaneously or concurrently such that the heat radiation emitted from the heating pad 102 is uniform across its surfaces. The present solution is not limited in this regard. The first and second conductive line portions can be designed such that heat radiation emission is not uniform across the heating pad's surfaces. For example, the first and second conductive line portions can have a different number of fingers and/or serpentine patterns.

Although only two fingers are shown in FIG. 11 per conductive line portion, the present solution is not so limited. Any number of fingers can be provided in accordance with a given application. For example, in another architecture shown in FIG. 13, each conductive line portion comprises three fingers. The heating pad of FIG. 13 has an overall thickness that is greater than an overall thickness of the heating pad of FIGS. 11-12.

Figure 13A:
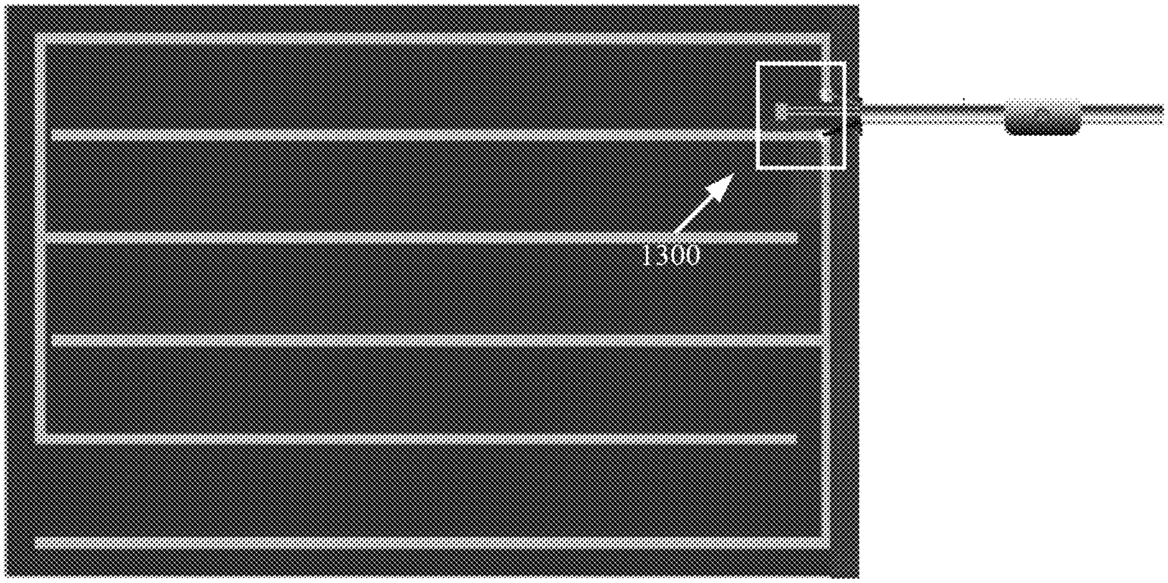
FIGS. 13A-B (collectively referred to as "FIG. 13") provides top views of other conductive layer architectures along with flexible sensors.

The conductive line portions 1130, 1132 are connected to the cable 108 via wires 1106, 1110 and electrodes 1108, 1112. In some scenarios, at least the wire-electrode connections are enclosed or otherwise encompassed by an environmental seal component 1300 as shown in FIG. 13. The environment seal component 1300 is provided to ensure or minimize any damage to the circuit components due to fluid(s), debris, deformation of the heating pad and/or extreme temperature change(s) beyond that which the electronic device is intended to operate in.

The cable 108 is connected to a controller 114. The controller 114 will be described in detail below. Still, it should be noted here that the controller 114 is generally configured to facilitate the turning On/Off of the electric heater 100 whereby a voltage is applied to the heating pad 102 and/or the adjustment of an amount of current that is supplied to the circuit layer 404 via cable 108 whereby the overall temperature of the heating pad 102 is increased/decreased. Accordingly, the controller 114 may also coupled to an internal power source via wires 1114 and/or an external power source via cable 108. The internal power source can include, but is not limited to, flexible batteries (e.g., graphene batteries), flexible energy harvesting circuit (e.g., flexible piezoelectric energy harvester), and/or capacitor(s). The energy harvesting circuit can be configured to harvest energy from light, movement (e.g., vibration), and/or Radio Frequency (RF) signals.

The circuit layer 404 also comprises electronic device(s) 1116. The electronic device(s) 1116 can include, but is(are) not limited to, Integrated Circuit(s) (ICs), processor(s), data store(s), wireless communication devices (e.g., flexible wireless transceiver(s)), temperature sensor(s) (e.g., thermistor(s)), moisture sensor(s), location sensor(s), proximity sensor(s), pressure sensor(s), sound sensor(s), camera(s) and/or power supply circuits. The temperature sensor(s) can detect and measure the temperature of the heating pad 102, the temperature of a surrounding environment, and/or a temperature of an item in proximity thereto. The moisture sensor(s) can detect and measure the amount of moisture in the heating pad 102 and/or the humidity of a surrounding environment. The location sensor(s) can detect a geographic location of the heating pad 102 and/or a distance of the heating pad 102 from sea level. The pressure sensor(s) can detect and/or measure an amount of pressure being applied to the heating pad by an external object. The pressure measurement can be used to facilitate control of the electric heater 100. The proximity sensor(s) can detect when an item is proximate thereto. The sound sensor(s) can detect the presence of sound and/or measure an amount of sound or variations in sound pressure. The sound sensor can include, but is not limited to, a diaphragm microphone. The camera(s) can capture image(s) of a surrounding environment and/or an item in proximity to the electric heater. The sensor data can be stored in data store(s) internal to and/or external to the heating pad 102. The electronic device(s) 1116 is(are) coupled to the controller 1118 via wires 1114 of cable 108.

Figure 13B:
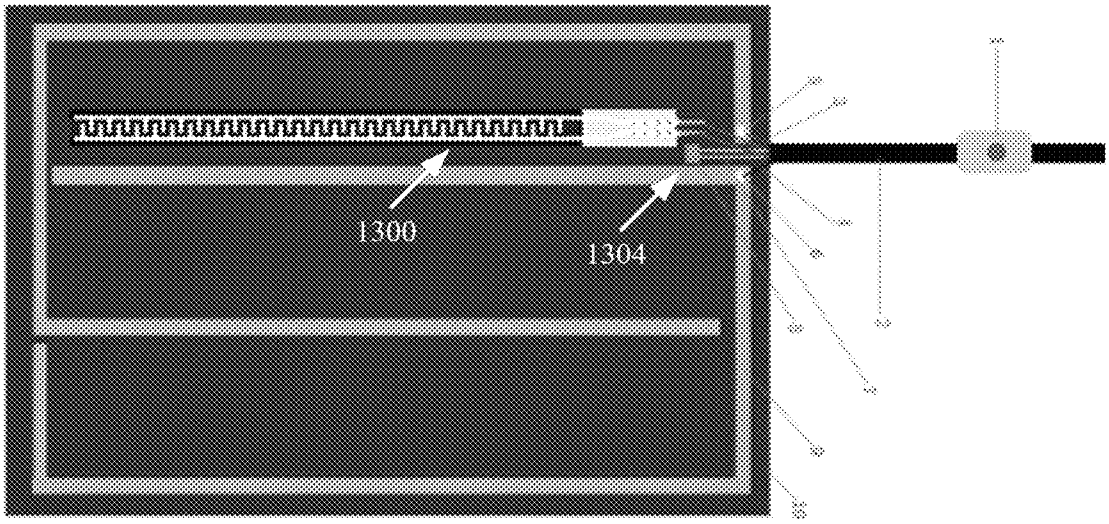

The present solution is not limited to the architecture shown in FIG. 11. The sensors can have different sizes, shapes and/or locations than that shown in FIG. 11. For example, as shown in FIG. 13B, a relatively large pressure sensor 1302 is provided in addition to other electronic devices 1304. The pressure sensor 1302 can disposed on the heating fabric layer 402 or the nanotube-based film layer 406. The pressure sensor 1302 can have a length (e.g., 250 mm), a width (e.g., 15 mm) and a thickness (e.g., 0.2 mm) selected in accordance with a particular application. The pressure sensor 1302 can have a working temperature of, for example, −40° C.~+100° C. The present solution is not limited to the particulars of FIG. 13B.

The sensor data can be used to facilitate the control of the electric heater 100. For example, the electric heater 100 can be automatically turned on when the heating pad detects that a particular type of object is in proximity thereto. This detection can be made using data generated by the proximity sensor(s), pressure sensor(s), sound sensor(s), camera(s) and/or location sensor(s). In this regard, it should be noted that a first food item of a first type would apply less pressure to the heating pad than a second food item of a second type, e.g., when the first food item weighs less than the second food item. Thus, pressure measurement(s) can be compared to entries in a Look Up Table (LUT) and/or threshold hold values that are pre-defined by certain types of items. An item is considered to be of a given type associated with an LUT entry in which the pressure measurement(s) exist. The present solution is not limited to the particulars of this example.

In some scenarios, the amount of current supplied to the heating pad 102 is automatically adjusted by controller 1118 based on information received from the electronic device(s) 1116 and/or other information received from an external device 1150. The external device 1150 can include, but is not limited to, a mobile phone, a smart phone, a personal digital assistant, a personal computer, a desktop computer, a laptop, a tablet, a remote controller, a cloud based system and/or a network node. For example, the current is adjusted when a humidity of a surrounding environment exceeds a threshold value, an amount of moisture in the heating pad exceeds a threshold level, and/or the distance of the heating pad above sea level exceeds a threshold value. Alternatively or additionally, the current may be selected so that the temperature of the heating pad increases to a desired level in a given amount of time dependent on conditions of a surrounding environment (e.g., temperature and/or humidity). An LUT can be used to facilitate the current selection. The present solution is not limited to the particulars of this example.

If batteries are integrated or otherwise disposed in the heating pad 102, a battery charger 1152 can be provided to re-charge the batteries. The battery charger 1152 can include, but is not limited to, an inductive battery charger, a wireless battery charger and/or a wired battery charger designed to be coupled/decoupled from the controller 114. The battery charger 1152 may be configured to be used to charge the internal or external batteries of the heating pad relatively quickly. The battery charger 1152 may or may not be compatible for use in charging batteries of other electronic device (i.e., devices other than the electric heater and/or external power source). The battery charger 1152 may have output devices for indicating a battery charge states (e.g., a fully charged status, a partially charged status or a low charge status). The output devices can include, but are not limited to, LEDs, display(s), and/or speaker(s).

Figure 14:
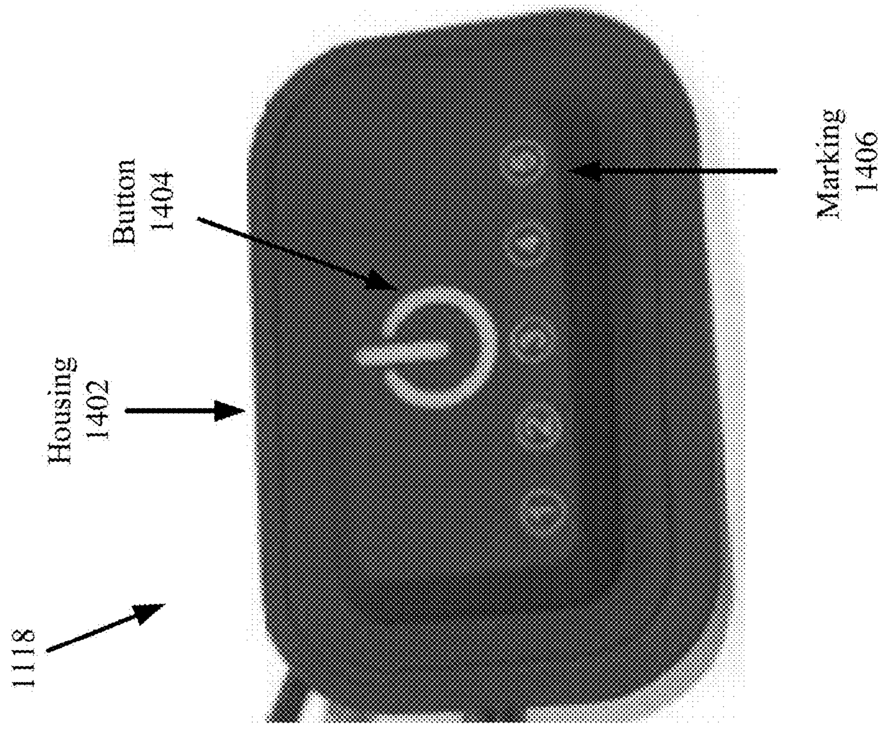
FIG. 14 provides a perspective view of a controller that can be used.

Referring now to FIG. 14, there is provided a top perspective view of controller 114. Controller 114 is generally configured to facilitate control of the electric heater 100. In this regard, controller 114 comprises a housing 1402 in which a circuit (not visible in FIG. 14) is disposed. The circuit is generally configured to facilitate operational mode transitions of the electronic heater 100. The operational modes include, but are not limited to, an On/Off mode, a low heat mode, a medium heat mode, a high heat mode, and/or a battery charging mode. Accordingly, the circuit can include, but is not limited to, I/O devices (e.g., switch(es), button(s), knob(s) and/or touch screen) and/or a computing device (e.g., computing device 1600 of FIG. 16). The housing 1402 may include two parts coupled to each other so as to provide an environmental seal to protect the internal circuit from damage due to, for example, liquids and/or debris. The housing can be made of any suitable material such as plastic.

Marking(s) 1406 may be disposed on, printed on or formed in the housing 1402. The marking(s) 1406 can indicate to a user an operational state of the electric heater (e.g., an on state, an off state, a battery charging state, etc.) and/or the setting for a heat level parameter of the heating pad 102. For example, there may be five settings for the heat/current level parameter with one being the lowest setting and five being the highest setting. The present solution is not limited to the particulars of this example.

Figure 15:
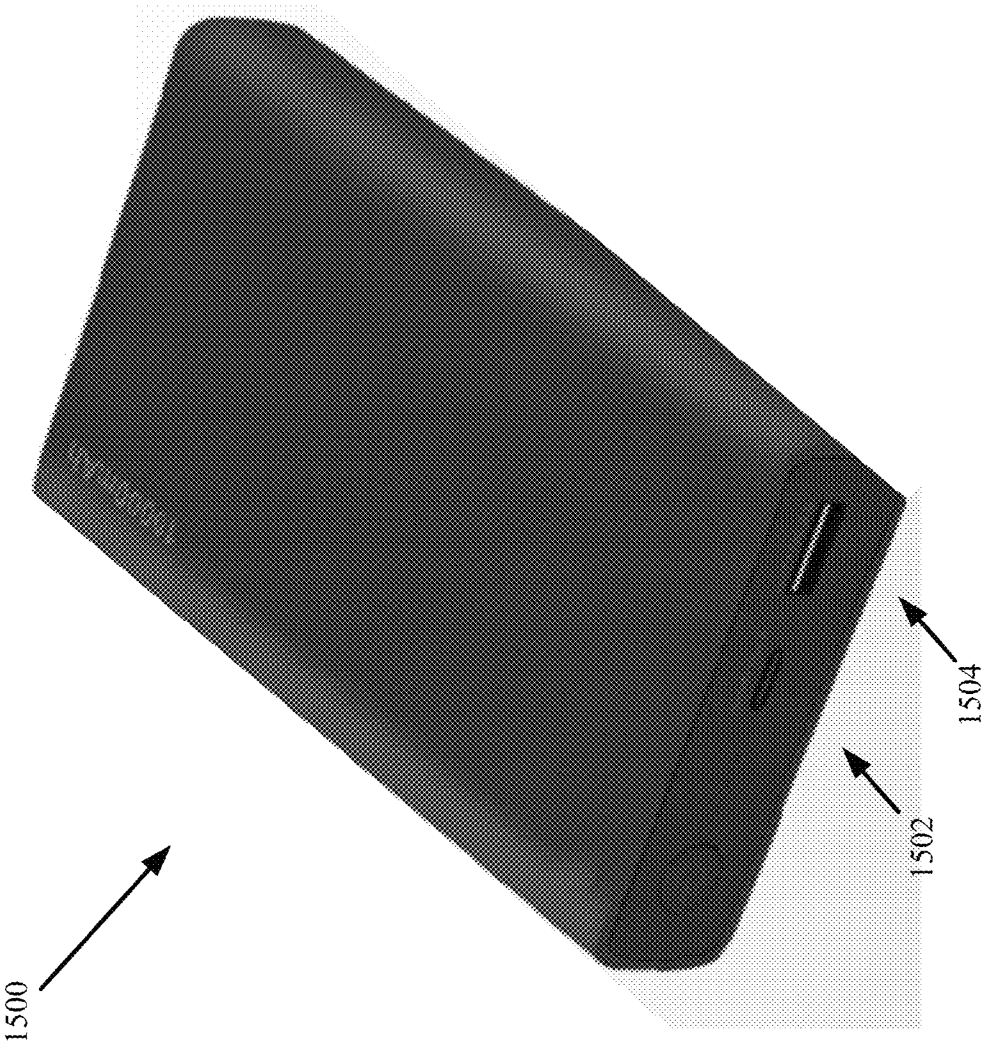
FIG. 15 provides a perspective view of a power supply that can be used to power the electric heater.

Referring now to FIG. 15, there is provided a perspective view of an illustrative power source 1500 that can be used with the electric heater 100. The power source can include, but is not limited to, graphene batteries. The power source 1500 may be configured with different capacities (e.g., 5000 mAh, 10000 mAh, 15000 mAh and/or 20000 mAh) and/or different voltage outputs (e.g., 5 V, 9 V, 12 V, 20 V and/or 24 V). In some scenarios, the output voltage has a default setting of 12 V with 5 A current. The present solution is not limited in this regard. One or more types of output ports can be provided with power source 1500. For example, the power source has a Type C output port 1502 and a Universal Serial Bus (USB) port 1504. The present solution is not limited to the particulars of this example. The power source 1500 may be configured to automatically stop the supply of power to the electric heater 100 when the electric heater is not in use and/or an object of a given type is not in proximity to the electric heater. The power supplied from the power source 1500 to the electric heater is uniform and independent of the heat generating mechanism in the heating pad.

In the insulated bag scenarios, the power source 1500 may be also stored in the insulated bag 150 or can be external to the insulate bag. The electric heater 100 can be connected to the power source 1500 prior to or subsequent to being inserted into cavity/pocket 152 of the insulated bag 150 or the electric heater can just be placed in the insulated bag. A separate pocket 154 may optionally be provided in the cavity/pocket for receiving and retaining the power source 1500 in a given position inside the insulated bag relative to the heating pad 102. Pocket 254 can ensure that power is continuously supplied from the power source 1500 to the electric heater 100 throughout use and/or transport of the insulated bag.

Figure 16:
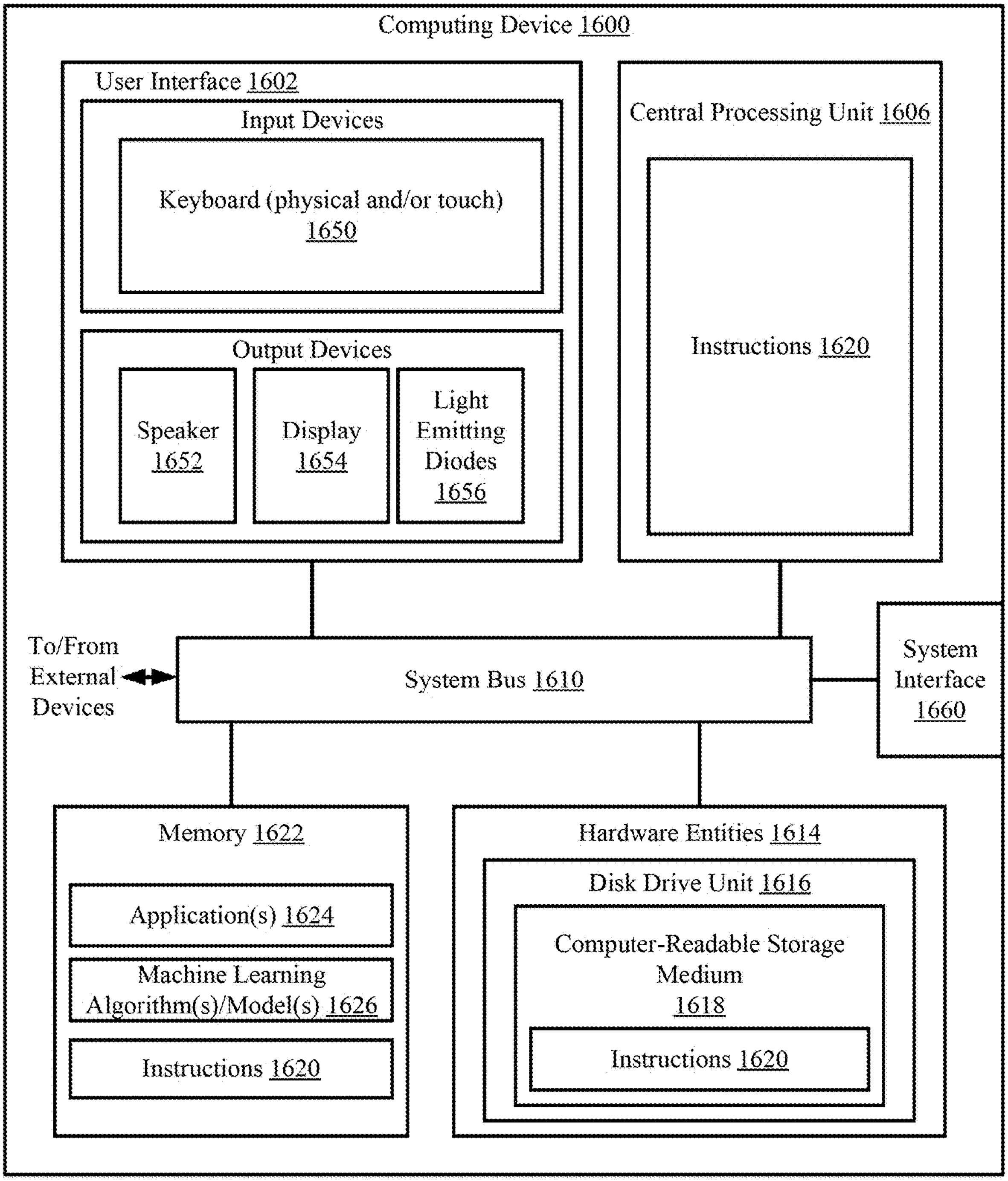
FIG. 16 provides an illustration of a computing device.

Referring now to FIG. 16, there is shown a hardware block diagram comprising an illustrative computing device 1600. Controller 114 of FIG. 1, electronic device(s) 1116 of FIG. 11, electronic device 1150 of FIG. 1, battery charger 1152 of FIG. 11 and/or power supply 1500 of FIG. 15 can be the same as or substantially similar to computing device 1600. As such, the discussion of computing device 1600 is sufficient for understanding controller 114 of FIG. 1, electronic device(s) 1116 of FIG. 11, electronic device 1150 of FIG. 1, battery charger 1152 of FIG. 11 and/or power supply 1500 of FIG. 15.

Computing device 1600 may include more or less components than those shown in FIG. 16. However, the components shown are sufficient to disclose an illustrative solution implementing the present solution. The hardware architecture of FIG. 16 represents one implementation of a representative computing device configured to enable heating of item(s) as described herein. As such, the computing device 1600 of FIG. 16 implements at least a portion of the method(s) described herein.

Some or all the components of the computing device 1600 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 16, the computing device 1600 comprises a user interface 1602, a CPU 1606, a system bus 1610, a memory 1622 connected to and accessible by other portions of computing device 1600 through system bus 1610, and hardware entities 1614 connected to system bus 1610. The user interface can include input devices (e.g., a keypad 1650) and output devices (e.g., a speaker 1652, a display 1654, and/or light emitting diodes 1656), which facilitate user-software interactions for controlling operations of the computing device 1600.

At least some of the hardware entities 1614 perform actions involving access to and use of memory 1622, which can be a RAM, a disk driver, network device, cloud-based device, and/or a CD-ROM. Hardware entities 1614 can include a disk drive unit 1616 comprising a computer-readable storage medium 1618 on which is stored one or more sets of instructions 1620 (e.g., software code) configured to implement one or more of the methodologies, procedures, or functions described herein. The instructions 1620 can also reside, completely or at least partially, within the memory 1622 and/or within the CPU 1606 during execution thereof by the computing device 1600. The memory 1622 and the CPU 1606 also can constitute machine-readable media. The term "machine-readable media", as used here, refers to a single medium or multiple media (e.g., a centralized or distributed database, and/or associated caches and servers) that store the one or more sets of instructions 1620. The term "machine-readable media", as used here, also refers to any medium that is capable of storing, encoding or carrying a set of instructions 1620 for execution by the computing device 1600 and that cause the computing device 1600 to perform any one or more of the methodologies of the present disclosure.

In some scenarios, the hardware entities 1614 include an electronic circuit (e.g., a processor) programmed for facilitating the heating of item(s). In this regard, it should be understood that the electronic circuit can access and run application(s) 1624 and/or a machine learning application(s) 1626 installed on the computing device 1600.

The application(s) 1624 may be configured to facilitate control and/or operation of an electric heater (e.g., electric heater 100 of FIG. 1). Accordingly, the application(s) 1624 can be used to check an operational mode of the electric heater, modify or otherwise transition an operational mode of the electric heater, check parameter settings for the electric heater (e.g., a temperature setting, a current setting and/or a voltage rating), modify parameter settings for the electric heater and/or power source, check battery charge levels for the electric heater and/or power source, check an energy harvesting status for a heating pad, check if any faults have been detected during use of the electric heater, define parameters for a customized heat cycle (e.g., a time of day for automatic turning on of the electric heater (e.g., 8 AM EST), a temperature level (e.g., 100° F.), a duration (e.g., 20 minutes), a time of day for automatic turning off of the electric heater (e.g., 8:20 AM EST), and/or a recurrence parameter settings (e.g., daily, every other day, every Thursday, every N weeks, etc.), check how many times the electric heater has been used during a given period of time (e.g., a day, week or month), check a health of the heating pad (E.g. strong, good, average or poor), initiate pairing or linking of the computing device with an electric heater, and/or cause wireless communication between the computing device paired or linked electric heater.

The application(s) 1624 can also facilitate the remote control of operational settings for a group of electric heaters such that they all operate in accordance with policies of a business entity (e.g., a restaurant or a chain of restaurants) or for an individual (e.g., heat pad on different body part locations like legs, chest, etc.). In this way, operational setting of two or more electric heaters can be set via common user-software interactions with the computing device 1600. For example, a user can select a single temperature value via a widget displayed on the computing device which causes the temperature setting to be changed on a plurality of electric heaters. The present solution is not limited in this regard.

In some scenarios, operational parameters for the electric heater 100 are pre-defined or customized for use with certain types of items. The sets of pre-defined/customized operational parameters can be stored in a datastore of the computing device and/or selected via a user interaction with application(s) 1624. For example, a user accesses a drop-down menu of a Graphical User Interface (GUI) presented on display 1654 and selects an item type from a plurality of different item types listed in the drop-down menu. The item type selection causes the electric heater to be controlled in accordance with pre-defined/customized operational parameters associated therewith.

The machine learning application(s) 1626 may implement(s) Artificial Intelligence (AI) that provides the computing device 1600 with the ability to automatically learn and improve data analytics from experience without being explicitly programmed. The machine learning application(s) employ(s) one or more machine learning algorithms that learn various information from accessed data (e.g., via pattern recognition and prediction making). Machine learning algorithms are well known in the art. For example, in some scenarios, the machine learning application 1626 employs a supervised learning algorithm, an unsupervised learning algorithm, and/or a semi-supervised algorithm. The machine learning algorithm(s) is(are) used to model temperature decisions based on data analysis (e.g., captured sensor information and other information). The modelled temperature decisions are represented in a machine learning model.

The machine learning model can be used to determine optimal temperature setting(s) for the electric heater based on various information. This information can include, user input information (e.g., user identifier, user preferences, medical information, physical condition information, etc.), sensor data (e.g., location of electric heater, temperature of heating pad, amount of pressure being applied to heating pad, and/or amount of moisture in fabric of heating pad, etc.), environmental data (e.g., temperature and/or humidity of surrounding environment, etc.), time of day, time of year, and/or type of item being heated (e.g., food, fluid/liquid, clothing, gloves, shoes, hat, blanket, car seat, etc.). In this way, operation of the electric heater can be customized and/or optimized for environmental conditions, item types, users, user preferences and/or user medical conditions.

Figure 17:
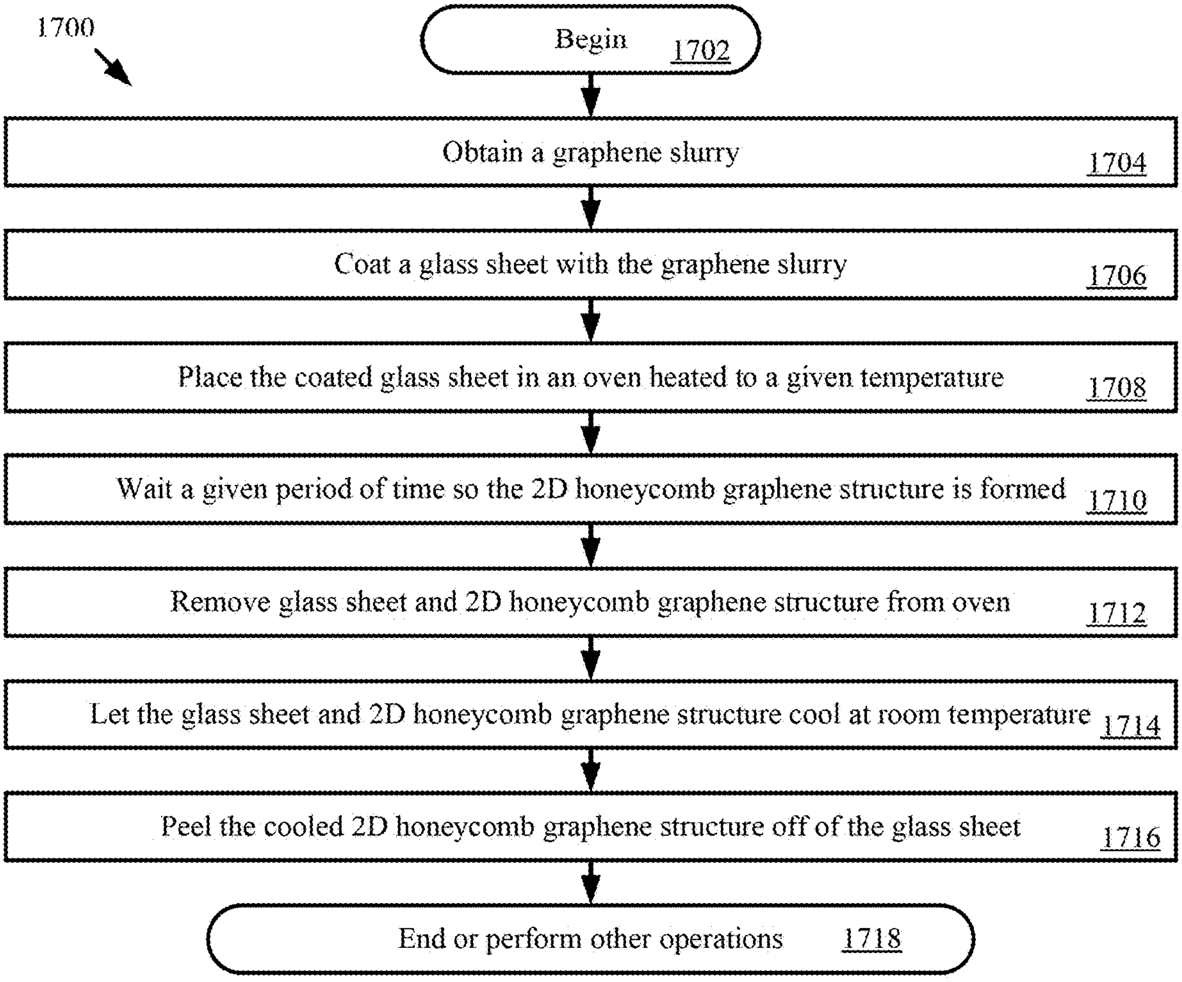
FIG. 17 provides a flow diagram of an illustrative method for making a graphene cloth or fabric from a graphene slurry.

Referring now to FIG. 17, there is provided a flow diagram of an illustrative method 1700 for making a heating fabric layer 402. As noted above, the heating fabric layer 402 can include a graphene cloth or fabric. The graphene cloth or fabric used herein is a novel cloth/fabric that is absent of various drawbacks of conventional graphene sheets. Conventional graphene sheets have poor heating uniformity, high material hardness, easy internal fracturing, multiple impurities, poor conductivity, poor stability, short service lives and/or high resistance (which results in excessive power consumption). In contrast, the present graphene cloth/fabric of the present solution has a relatively higher electrothermal conversion rate, electrical conductivity, thermal conductivity, stability, thermal uniformity, flexibility and longevity.

Method 1700 begins with 1702 and continues with 1704 where a graphene slurry is obtained. The graphene slurry is made of graphene powder, curing agent, auxiliary agent and other components. The following table lists the raw materials for the graphene slurry.

| No. | Material Name | Purity, Concentration |
|---|---|---|
| 1 | Graphene | Analytically pure, 98% |
| 2 | Polyurethane resin | Number average molecular weight 2200/3500 |
| 3 | N,N-Dimethylformamide | Analytically pure, 99.5% |
| 4 | Additives A | Analytically pure, 99% |
| 5 | Additives B | Type 201 |
| 6 | Additives C | Analytically pure, 97% |
| 7 | Additives D | Analytically pure, 99% |
| 8 | Additives E | 52% |

The graphene slurry can be prepared by, for example: accurately weighing 45 g of Thermoplastic Polyurethane (TPU) resin with a number average molecular weight of 22000; dissolving the TPU in 150 g of Dimethylformamide (DMF) at a dissolution temperature of 80° C.; waiting until the dissolution is completely reduced to room temperature; adding 55 g of Auxiliary A to the dissolution; stirring the mixture evenly to produce a first resin solution; accurately weigh 35 g of TPU resin with a number average molecular weight of 35000; dissolving the TPU in 150 g of DMF at a dissolution temperature of 80° C.; waiting until the dissolution is completely reduced to room temperature; adding 65 g of Auxiliary A to the dissolution; stirring the mixture evenly to produce a second resin solution. The first and second resin solutions are mixed together and stirred uniformly at a mass ratio of 1:1 to prepare a graphene solvent. Graphene slurries with different concentration gradients can be prepared in accordance with this process. The mass concentrations can include, but are not limited to, 3.5%, 4.5%, 5.5%, 6.5%, 7.5%, 8.5% and/or 9.5%. The total mass fraction of the four additives can also be varied.

Next in 1706, a glass sheet is coated with the graphene slurry. The coated glass sheet is then placed in an oven heated to a given temperature (e.g., 120° C.), as shown by 1708. In 1710, the coated glass sheet remains in the oven for a given period of time (e.g., 2 hours) so that the graphene slurry dries at a constant temperature. The dried graphene slurry forms a 2D hexagonal honeycomb graphene structure. The glass sheet and 2D hexagonal honeycomb graphene structure are then removed from the oven in 1712. The same are allowed to cool in 1714 at room temperature. The cooled 2D hexagonal honeycomb graphene structure is referred to as a graphene cloth or fabric.

In 1716, the graphene cloth or fabric is then peeled off of the glass sheet such that the 2D hexagonal honeycomb structure is retained. The peeling process ensures that the overall performance of electrothermal conversion rate, electrical conductivity, thermal conductivity, stability, thermal uniformity, flexibility and longevity are improved as compared to those of conventional graphene sheets.

Figure 18:
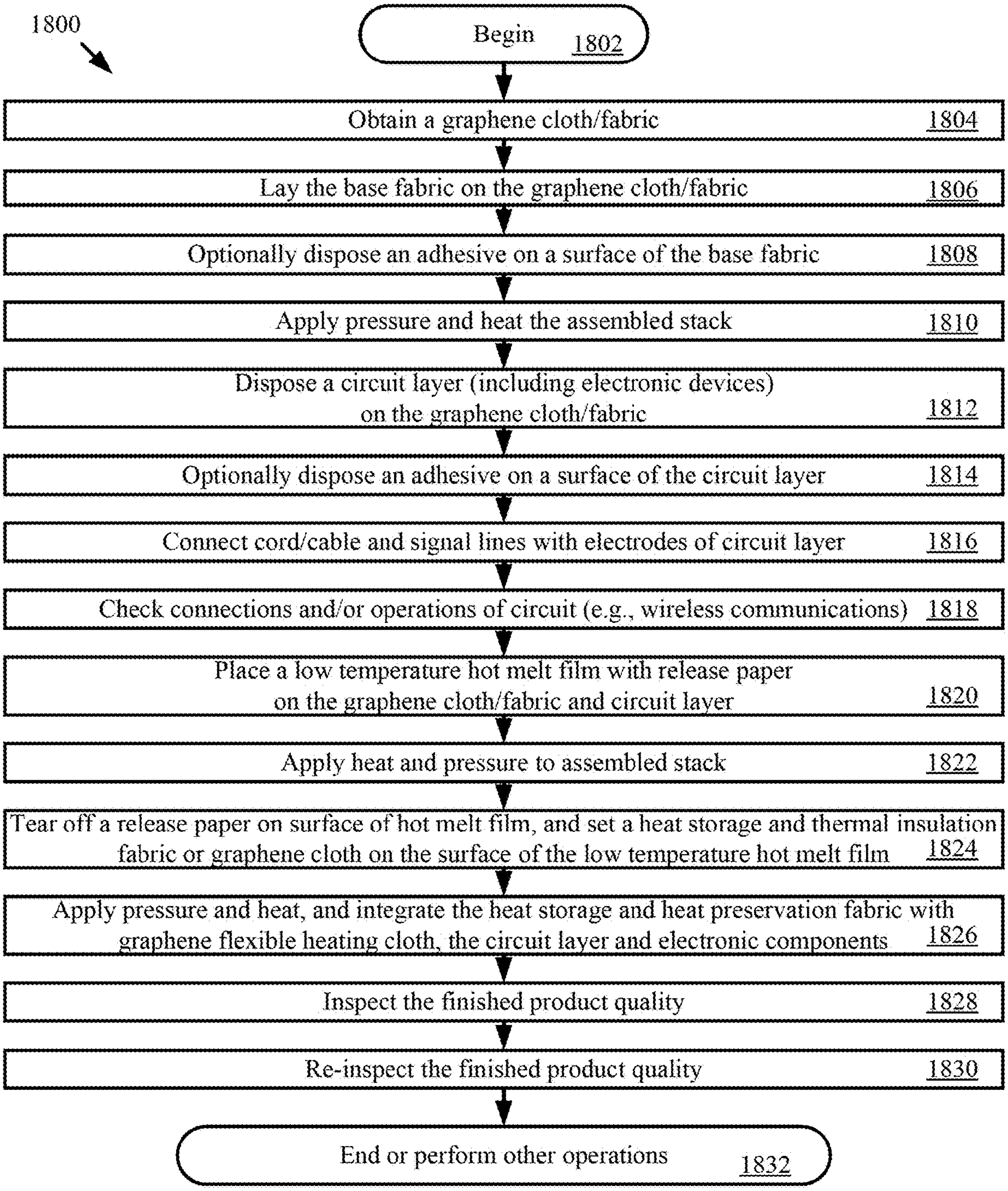
FIG. 18 provides a flow diagram of an illustrative method for making a heating pad.

Referring now to FIG. 18, there is provided a flow diagram of an illustrative method 1800 for making a heating pad (e.g., heating pad 102 of FIG. 1). Method 1800 begins with 1802 and continues with 1804 where a graphene cloth/fabric is obtained. The graphene cloth/fabric may be produced in accordance with method 1700 discussed above. A base fabric is laid on the graphene fabric/cloth in 1806. The base fabric can include, but is not limited to, a polyester cloth. An adhesive may optionally be disposed on a surface of the base fabric as shown by 1808. The adhesive may include, but is not limited to, a thermally conductive silicon adhesive. Next in 1810, a hot press is used to apply heat and pressure to the assembled stack comprising the graphene cloth/fabric and base fabric.

Thereafter in 1812, a circuit layer is disposed on the graphene cloth/fabric. The circuit layer can include a patterned conductive film and/or electronic devices (e.g., sensors, etc.). In 1814, an adhesive may optionally be disposed on a surface of the circuit layer. A cord/cable (e.g., cable 108 of FIG. 1) and/or signal lines are connected in 1816 to electrodes (e.g., electrodes 1108, 1112 of FIG. 11) of the circuit layer. The connections and/or operations of the circuit are then checked or tested in 1818. For example, a wireless communication capability is tested for proper operation. If the circuit connections and operations are satisfactory, then a low temperature hot melt film with a release paper is disposed on the graphene cloth/fabric and circuit layer in 1820. Next in 1822, heat and pressure are then applied to the assembly stack as shown by 1820.

In 1824, a release paper on the surface of the hot melt film is torn off. A heat storage and insulation fabric and/or graphene cloth is set on a surface of the low temperature hot melt film. Heat and pressure are applied to the assembled stack in 1826. The heat storage/heat preservation fabric is integrated with the graphene flexible heating cloth, the circuit layer and electric components.

The quality of the finished product is inspected in 1828 and re-inspected in 1830. The inspections of 1828 and 1830 can involve checking whether an appearance is defective, whether the detection circuit is normal, whether the detection sensor signal is normal, whether the working current and resistance are normal, whether the wireless communication between an external device (e.g., a smart phone) and the controller is normal, and/or whether the heating temperature is normal. Subsequently, 1832 is performed where method 1800 ends or other operations are performed.

The above described processes 1700, 1800 have been used to produce heating pads comprising graphene cloths/fabrics with different thicknesses. The following Examples are provided that are useful for understanding similarities and differences in the electrical properties of graphene flexible heating cloths having different thicknesses.

Example 1

Figure 19:
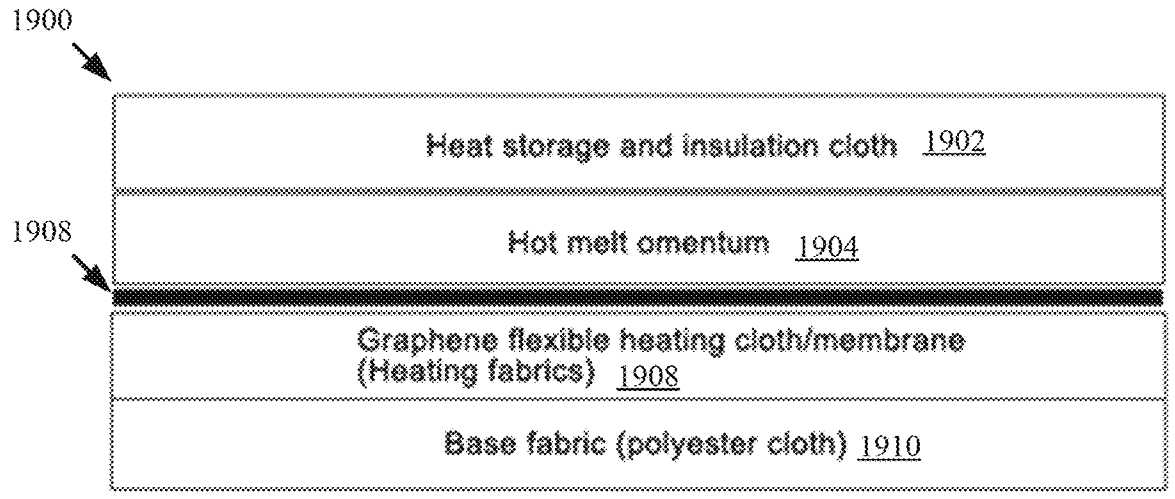
FIGS. 19-21 provide illustrations of various heating pad architectures.

In this example, a relatively thin graphene heating pad 1900 is created. The layer structure for this heating pad 1900 is shown in FIG. 19. The layers include a heat storage and insulation cloth 1902, a hot melt omentum 1904, a circuit layer 1906, a graphene flexible heating cloth/membrane 1908, and a base fabric (e.g., a polyester cloth) 1910. The present solution is not limited to the particulars of this example.

Example 2

Figure 20:
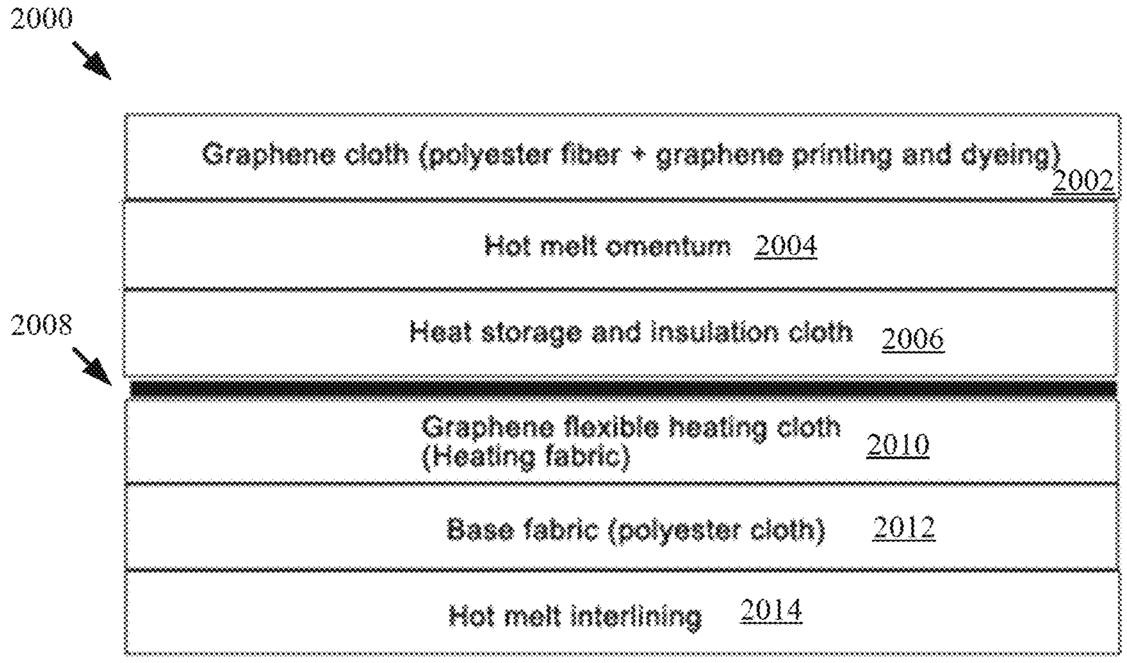

In this example, a relatively thick graphene heating pad 2000 is created. The layer structure for this heating pad 2000 is shown in FIG. 20. The layers include a graphene cloth 2002, a hot melt omentum 2004, a heat storage and insulation cloth 2006, a circuit layer 2008, a graphene flexible heating cloth 2010, a base fabric 2012, and a hot melt interlining 2014.

Illustrative temperatures and pressures used during process 1800 for the hot melt and low temperature melt meshes are: high temperature hot melt mesh omentum—hot pressing temperature 145° C. to 160° C. and pressure 2 KG; low temperature hot melt omentum—hot pressing temperature 90° C. and pressure 2 KG. After the heating pad is integrated by hot pressing, as long as the temperature for the graphene flexible heating pad does not exceed 120° C., the performance of the hot melt film will not be affected. The present solution is not limited to the particulars of this example.

Example 3

Figure 21:
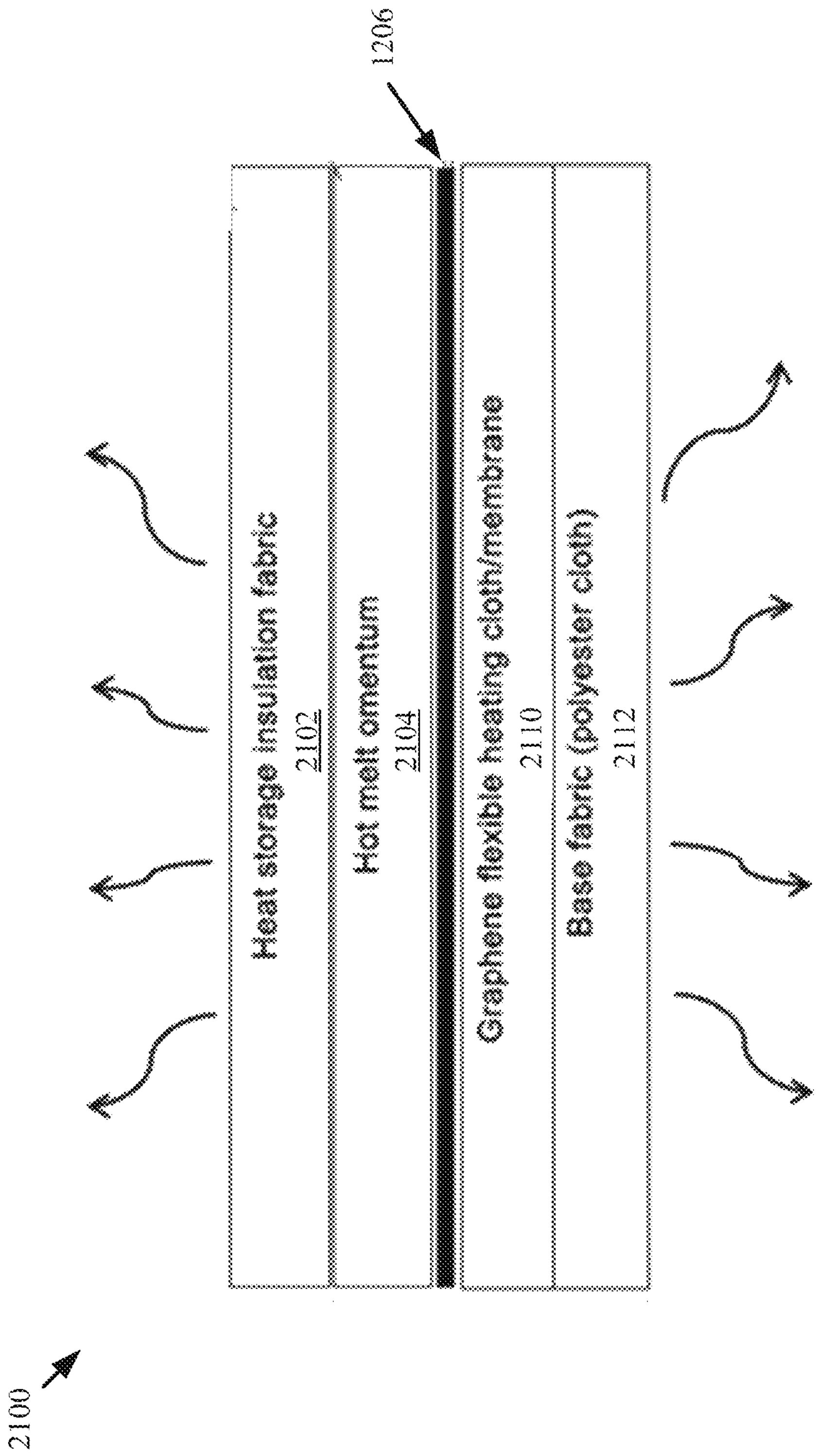

In this example, a relatively thin graphene heating pad 2100 is created. The layer structure for this heating pad 2100 is shown in FIG. 21. The layers include a heat storage insulation fabric 2102, a hot melt omentum 2104, a circuit layer 1206, a graphene flexible heating cloth/membrane 2110, and a base fabric (e.g., a polyester cloth) 2112. The heating pad 2100 comprise 31.7% heat storage insulation fabric 2102, 3.9% hot melt omentum 2104, 1% circuit layer 1206 (e.g., a red copper film), 31.7% graphene flexible heating cloth/membrane 2110, and 31.7% base fabric 2112. The present solution is not limited to the particulars of this example.

Example 4

In this example, a heating pad is created using a graphene flexible heating cloth that has a thickness (e.g., thickness 410 of FIG. 4) of 8 mm, a width of 20 cm, a length of 30 cm, an area of 600 $cm^2$, and a surface resistance of 2.65 Ohms. The ambient temperature is 17° C. and the environmental humidity is ≥85%.

| Temperature and power density | | |
|---|---|---|
| Heating Temp. (° C.) | Power ($W/cm^2$) | Power ($KW/m^2$) |
| 30 | 0.0912 | 91.20 |
| 40 | 0.0916 | 91.60 |
| 50 | 0.0920 | 92.00 |
| 60 | 0.0924 | 92.40 |
| 70 | 0.0926 | 92.60 |
| 75 | 0.0928 | 92.80 |
| 80 | 0.0932 | 93.20 |
| 85 | 0.0936 | 93.60 |

| Electrical Properties | | | |
|---|---|---|---|
| Heating Temp (° C.) | Power (W) | Voltage (V) | Current (A) |
| 30 | 54.72 | 12 | 4.56 |
| 40 | 54.96 | 12 | 4.58 |
| 50 | 55.20 | 12 | 4.60 |
| 60 | 55.44 | 12 | 4.62 |
| 70 | 55.56 | 12 | 4.63 |
| 75 | 55.68 | 12 | 4.64 |
| 80 | 55.92 | 12 | 4.66 |
| 85 | 56.16 | 12 | 4.68 |

| Heating temperature rise time | |
|---|---|
| Heating Time | Temp (° C.) |
| 30 seconds | 35 |
| 1 minute | 40 |
| 2 minutes | 50 |
| 4 minutes | 60 |
| 6 minutes | 65 |
| 8 minutes | 70 |
| 10 minutes | 75 |
| 13 minutes | 80 |
| 15 minutes | 85 |

The present solution is not limited to the particulars of this example.

Example 5

In this example, a heating pad is created using a graphene flexible heating cloth that has a thickness (e.g., thickness 410 of FIG. 4) of 8 mm, a width of 20 cm, a length of 30 cm, an area of 600 $cm^2$, and a surface resistance of 3.11 Ohms. The ambient temperature is 17° C. and the environmental humidity is ≥85%.

| Temperature and power density | | |
|---|---|---|
| Heating Temp. (° C.) | Power ($W/cm^2$) | Power ($KW/m^2$) |
| 30 | 0.0740 | 74.00 |
| 40 | 0.0742 | 74.20 |
| 50 | 0.0744 | 74.40 |
| 60 | 0.0746 | 74.60 |
| 70 | 0.0755 | 75.50 |
| 75 | 0.0760 | 76.00 |
| 80 | 0.0764 | 76.40 |
| 85 | 0.0771 | 77.10 |

| Electrical Properties | | | |
|---|---|---|---|
| Heating Temp (° C.) | Power (W) | Voltage (V) | Current (A) |
| 30 | 44.40 | 12 | 3.70 |
| 40 | 44.52 | 12 | 3.71 |
| 50 | 44.68 | 12 | 3.72 |
| 60 | 44.80 | 12 | 3.73 |
| 70 | 45.30 | 12 | 3.77 |
| 75 | 45.60 | 12 | 3.80 |
| 80 | 45.85 | 12 | 3.82 |
| 85 | 46.30 | 12 | 3.85 |

| Heating temperature rise time | |
|---|---|
| Heating Time | Temp (° C.) |
| 30 seconds | 38 |
| 1 minute | 40 |
| 2 minutes | 50 |
| 3 minutes | 55 |
| 4 minutes | 60 |
| 5 minutes | 65 |
| 7 minutes | 70 |
| 10 minutes | 75 |
| 12 minutes | 80 |
| 15 minutes | 85 |

The present solution is not limited to the particulars of this example.

Example 6

In this example, a heating pad is created using a graphene flexible heating cloth that has a thickness (e.g., thickness 410 of FIG. 4) of 0.26 mm, a width of 20 cm, a length of 30 cm, an area of 600 $cm^2$, and a surface resistance of 2.65 Ohms. The ambient temperature is 17° C. and the environmental humidity is ≥85%.

| Temperature and power density | | |
|---|---|---|
| Heating Temp. (° C.) | Power ($W/cm^2$) | Power ($KW/m^2$) |
| 30 | 0.0912 | 91.20 |
| 40 | 0.0916 | 91.60 |
| 50 | 0.0920 | 92.00 |
| 60 | 0.0924 | 92.40 |
| 70 | 0.0926 | 92.60 |
| 75 | 0.0928 | 92.80 |
| 80 | 0.0932 | 93.20 |
| 85 | 0.0936 | 93.60 |

| Electrical Properties | | | |
|---|---|---|---|
| Heating Temp (° C.) | Power (W) | Voltage (V) | Current (A) |
| 30 | 54.72 | 12 | 4.56 |
| 40 | 54.96 | 12 | 4.58 |
| 50 | 55.20 | 12 | 4.60 |
| 60 | 55.44 | 12 | 4.62 |
| 70 | 55.56 | 12 | 4.63 |
| 75 | 55.68 | 12 | 4.64 |
| 80 | 55.92 | 12 | 4.66 |
| 85 | 56.16 | 12 | 4.68 |

| Heating temperature rise time | |
|---|---|
| Heating Time | Temp (° C.) |
| 30 seconds | 35 |
| 1 minute | 40 |
| 3 minutes | 50 |
| 6 minutes | 60 |
| 8 minutes | 65 |
| 10 minutes | 70 |
| 13 minutes | 75 |
| 15 minutes | 80 |
| 20 minutes | 85 |

The present solution is not limited to the particulars of this example.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A heating pad that is portable, comprising:
- a plurality of material layers arranged in a stack, the plurality of material layers comprising:
  - a first heating fabric comprising graphene;
  - a nanotube-based film having a first surface coupled to the first heating fabric;
  - a second heating fabric coupled to a second opposing surface of the nanotube-based film; and
  - a flexible circuit disposed between the first heating fabric and the nanotube-based film, the flexible circuit configured to facilitate an increase in temperature by at least the first and second heating fabrics; and
- a flexible output device at least partially encompassing the stack and configured to (1) output information to a user of the heating pad and (2) protect one or more edges of the heating pad from damage;
- wherein the flexible circuit comprises a first flexible sensor and is configured to adjust a current level based on sensor data generated by the first flexible sensor, the first flexible sensor comprising (i) a pressure sensor configured to sense an amount of pressure being applied to the heating pad by an external object and or (ii) a location sensor configured to sense a geographic location of the heating pad and or a height of the heating pad above sea level.

2. The heating pad according to claim 1, wherein the first heating fabric comprises a monolayer of carbon atoms connected to each other via sp2 hybridization to form a planar two-dimensional hexagonal honeycomb lattice structure.

3. The heating pad according to claim 1, wherein the nanotube-based film comprises a carbon nanotube film.

4. The heating pad according to claim 1, wherein the second heating fabric comprises at least one of a carbon fiber paper, a carbon fiber cloth and a graphite fiber cloth.

5. The heating pad according to claim 1, wherein the heating pad is configured to convert at least 75% of electric energy into heat energy.

6. The heating pad according to claim 1, wherein the heating pad has a radiation efficiency of at least 70%.

7. The heating pad according to claim 1, wherein the flexible circuit is configured to operate with a voltage less than or equal to 36 Volts.

8. The heating pad according to claim 1, wherein the heating pad is flexible and washable without affecting physical and electrical properties of the heating pad.

9. The heating pad according to claim 1, wherein the flexible circuit comprises a flexible battery or the flexible circuit may be energized by a flexible battery.

10. The heating pad according to claim 9, wherein the flexible battery comprises a graphene battery.

11. The heating pad according to claim 1, wherein the flexible circuit comprises at least a first conductive line portion and a second conductive line portion which are separately supplied power from a power source at the same time.

12. The heating pad according to claim 11, wherein the first and second conductive line portions are designed and positioned relative to each other such that heat radiation is emitted uniformly across exposed surfaces of the heating pad.

13. The heating pad according to claim 11, wherein the first and second conductive line portions partially overlap each other while being electrically isolated from each other.

14. The heating pad of claim 13, wherein the first conductive line portion comprises a plurality of first fingers, at least one of the first fingers residing between a plurality of second fingers of the second conductive line portion, and at least one of the plurality of second fingers residing between the plurality of fingers of the first conductive line portion.

15. The heating pad according to claim 11, wherein the flexible circuit further comprises a cable connected to the first and second conductive lines and a controller removably connected to the cable, the controller being configured to allow a user to selectively control an amount of current supplied to the first and second conductive lines from a power source.

16. The heating pad according to claim 15, wherein the power source is external to the heating pad and comprises a graphene battery.

17. The heating pad according to claim 15, wherein the controller is configured to facilitate wireless communications between the heating pad and an external communication device for remotely controlling operations of the heating pad.

18. The heating pad according to claim 1, wherein the flexible circuit is configured to facilitate wireless communications between the heating pad and an external communication device for remotely controlling operations of the heating pad.

19. The heating pad according to claim 1, wherein the heating pad is configured to reach 140° F. in less than or equal to sixty seconds.

20. The heating pad according to claim 1, wherein the heating pad is configured to reach 200° F. in less than or equal to one hundred eighty seconds.

21. The heating pad according to claim 1, wherein the heating pad is configured to experience a rise in temperature within three seconds of power being supplied thereto.

22. The heating pad according to claim 1, wherein the flexible circuit further comprises a second flexible sensor and is configured to cause the heating pad to transition operational modes based on sensor data generated by the first flexible sensor and or the second flexible sensor.

23. The heating pad according to claim 22, wherein operational modes comprise an off mode and an on mode.

24. The heating pad according to claim 22, wherein the second flexible circuit comprises at least one of a temperature sensor, a proximity sensor, a sound sensor, and a camera.

25. The heating pad according to claim 1, wherein the flexible output device comprises at least one of a light strip, an audio device and a vibration device.

26. A portable electric heater, comprising:

a controller configured to control a temperature setting of the portable electric heater;

a heating pad communicatively coupled to the controller and comprising a plurality of material layers arranged in a stack, the plurality of material layers comprising:

a first heating fabric comprising graphene;

a nanotube-based film having a first surface coupled to the first heating fabric;

a second heating fabric coupled to a second opposing surface of the nanotube-based film; and a flexible circuit disposed between the first heating fabric and the nanotube-based film, the flexible circuit configured to facilitate an increase in temperature by at least the first and second heating fabrics; and a flexible output device at least partially encompassing the stack and configured to (1) output information to a user of the heating pad and (2) protect one or more edges of the heating pad from damage;

wherein the flexible circuit comprises a first flexible sensor and is further configured to adjust a current level based on sensor data generated by the first flexible sensor, the first flexible sensor comprising (i) a pressure sensor configured to sense an amount of pressure being applied to the heating pad by an external object and or (ii) a location sensor configured to sense a geographic location of the heating pad and or a height of the heating pad above sea level.

27. The portable electric heater according to claim 26, wherein the first heating fabric comprises a monolayer of carbon atoms connected to each other via sp2 hybridization to form a planar two-dimensional hexagonal honeycomb lattice structure.

28. The portable electric heater according to claim 26, wherein the nanotube-based film comprises a carbon nanotube film.

29. The portable electric heater according to claim 26, wherein the second heating fabric comprises at least one of a carbon fiber paper, a carbon fiber cloth and a graphite fiber cloth.

30. The portable electric heater according to claim 26, wherein the heating pad is configured to convert at least 75% of electric energy into heat energy.

31. The portable electric heater according to claim 26, wherein the heating pad has a radiation efficiency of at least 70%.

32. The portable electric heater according to claim 26, wherein the flexible circuit is configured to operate with a voltage less than or equal to 36 Volts.

33. The portable electric heater according to claim 26, wherein the heating pad is flexible and washable without affecting physical and electrical properties of the heating pad.

34. The portable electric heater according to claim 26, wherein the flexible circuit comprises a flexible battery or the flexible circuit may be energized by a flexible battery.

35. The portable electric heater according to claim 34, wherein the flexible battery comprises a graphene battery.

36. The portable electric heater according to claim 26, wherein the flexible circuit comprises at least a first conductive line portion and a second conductive line portion which are separately supplied power from a power source at the same time.

37. The portable electric heater according to claim 36, wherein the first and second conductive line portions are designed and positioned relative to each other such that heat radiation is emitted uniformly across exposed surfaces of the heating pad.

38. The portable electric heater according to claim 36, wherein the first and second conductive line portions partially overlap each other while being electrically isolated from each other.

39. The portable electric heater of claim 38, wherein the first conductive line portion comprises a plurality of first fingers, at least one of the first fingers residing between a plurality of second fingers of the second conductive line portion, and at least one of the plurality of second fingers residing between the plurality of fingers of the first conductive line portion.

40. The portable electric heater according to claim 36, wherein the flexible circuit further comprises a cable connected to the first and second conductive lines and the controller is removably connected to the cable, the controller being configured to allow a user to selectively control an amount of current supplied to the first and second conductive lines from a power source.

41. The portable electric heater according to claim 40, wherein the power source is external to the heating pad and comprises a graphene battery.

42. The portable electric heater according to claim 40, wherein the controller is configured to facilitate wireless communications between the heating pad and an external communication device for remotely controlling operations of the heating pad.

43. The portable electric heater according to claim 26, wherein the flexible circuit is configured to facilitate wireless communications between the heating pad and an external communication device for remotely controlling operations of the heating pad.

44. The portable electric heater according to claim 26, wherein the heating pad is configured to reach 140° F. in less than or equal to sixty seconds.

45. The portable electric heater according to claim 26, wherein the heating pad is configured to reach 200° F. in less than or equal to one hundred eighty seconds.

46. The portable electric heater according to claim 26, wherein the heating pad is configured to experience a rise in temperature within three seconds of power being supplied thereto.

47. The portable electric heater according to claim 26, wherein the flexible circuit further comprises a second flexible sensor and is configured to cause the heating pad to transition operational modes based on sensor data generated by the first flexible sensor and or the second flexible sensor.

48. The portable electric heater according to claim 47, wherein operational modes comprise an off mode and an on mode.

49. The portable electric heater according to claim 47, wherein the second flexible sensor comprises at least one of a temperature sensor, a proximity sensor, a sound sensor, and a camera.

50. The portable electric heater according to claim 26, wherein the flexible output device comprises at least one of a light strip, an audio device and a vibration device.

51. A product, comprising:

a main body with a pocket;

a heating pad disposed in the pocket and comprising:

a first heating fabric comprising graphene;

a nanotube-based film having a first surface coupled to the first heating fabric;

a second heating fabric coupled to a second opposing surface of the nanotube-based film; and a flexible circuit disposed between the first heating fabric and the nanotube-based film, the flexible circuit configured to facilitate an increase in temperature by at least the first and second heating fabrics; and a flexible output device at least partially encompassing the stack and configured to (1) output information to a user of the heating pad and (2) protect one or more edges of the heating pad from damage;

wherein the flexible circuit comprises a first flexible sensor and is configured to adjust a current level based on sensor data generated by the first flexible sensor, the first flexible sensor comprising (i) a pressure sensor configured to sense an amount of pressure being applied to the heating pad by an external object and or (ii) a location sensor configured to sense a geographic location of the heating pad and or a height of the heating pad above sea level.

52. The product according to claim 51, wherein the first heating fabric comprises a monolayer of carbon atoms connected to each other via sp2 hybridization to form a planar two-dimensional hexagonal honeycomb lattice structure.

53. The product according to claim 51, wherein the nanotube-based film comprises a carbon nanotube film.

54. The product according to claim 51, wherein the second heating fabric comprises at least one of a carbon fiber paper, a carbon fiber cloth and a graphite fiber cloth.

55. The product according to claim 51, wherein the heating pad is configured to convert at least 75% of electric energy into heat energy.

56. The product according to claim 51, wherein the heating pad has a radiation efficiency of at least 70%.

57. The product according to claim 51, wherein the flexible circuit is configured to operate with a voltage less than or equal to 36 Volts.

58. The product according to claim 51, wherein the heating pad is flexible and washable without affecting physical and electrical properties of the heating pad.

59. The product according to claim 51, wherein the flexible circuit comprises a flexible battery or the flexible circuit may be energized by a flexible battery.

60. The product according to claim 59, wherein the flexible battery comprises a graphene battery.

61. The product according to claim 51, wherein the flexible circuit comprises at least a first conductive line portion and a second conductive line portion which are separately supplied power from a power source at the same time.

62. The product according to claim 51, wherein the first and second conductive line portions are designed and positioned relative to each other such that heat radiation is emitted uniformly across exposed surfaces of the heating pad.

63. The product according to claim 62, wherein the first and second conductive line portions partially overlap each other while being electrically isolated from each other.

64. The product according to claim 63, wherein the first conductive line portion comprises a plurality of first fingers, at least one of the first fingers residing between a plurality of second fingers of the second conductive line portion, and at least one of the plurality of second fingers residing between the plurality of fingers of the first conductive line portion.

65. The product according to claim 61, wherein the flexible circuit further comprises a cable connected to the first and second conductive lines and the controller is removably connected to the cable, the controller being configured to allow a user to selectively control an amount of current supplied to the first and second conductive lines from a power source.

66. The product according to claim 65, wherein the power source is external to the heating pad and comprises a graphene battery.

67. The product according to claim 65, wherein the controller is configured to facilitate wireless communications between the heating pad and an external communication device for remotely controlling operations of the heating pad.

68. The product according to claim 51, wherein the flexible circuit is configured to facilitate wireless communications between the heating pad and an external communication device for remotely controlling operations of the heating pad.

69. The product according to claim 51, wherein the heating pad is configured to reach 140° F. in less than or equal to sixty seconds.

70. The product according to claim 51, wherein the heating pad is configured to reach 200° F. in less than or equal to one hundred eighty seconds.

71. The product according to claim 51, wherein the heating pad is configured to experience a rise in temperature within three seconds of power being supplied thereto.

72. The product according to claim 51, wherein the flexible circuit further comprises a second flexible sensor and is further configured to cause the heating pad to transition operational modes based on sensor data generated by the first flexible sensor and or the second flexible sensor.

73. The product according to claim 72, wherein operational modes comprise an off mode and an on mode.

74. The product according to claim 72, wherein the second flexible sensor comprises at least one of a temperature sensor, a proximity sensor, a sound sensor, and a camera.

75. The product according to claim 51, wherein the flexible output device comprises at least one of a light strip, an audio device and a vibration device.

* * * * *